(12) United States Patent
Yamazaki et al.

(10) Patent No.: US 12,522,739 B2
(45) Date of Patent: Jan. 13, 2026

(54) INK COMPOSITION (71) Applicant: DNP FINE CHEMICALS CO., LTD., Yokohama (JP)

(72) Inventors: Fumie Yamazaki, Yokohama (JP); Yukiko Ishima, Yokohama (JP); Ryosuke Kotani, Yokohama (JP); Ryoma Yasui, Yokohama (JP)

(73) Assignee: DNP FINE CHEMICALS CO., LTD., Yokohama (JP)

( * ) Notice: Subject to any disclaimer, the term of this patent is extended or adjusted under 35 U.S.C. 154(b) by 238 days.

(21) Appl. No.: 18/032,434

(22) PCT Filed: Oct. 29, 2021

(86) PCT No.: PCT/JP2021/040085
§ 371 (c)(1),
(2) Date: Apr. 18, 2023

(87) PCT Pub. No.: WO2022/092282
PCT Pub. Date: May 5, 2022

(65) Prior Publication Data
US 2023/0392031 A1 Dec. 7, 2023

(30) Foreign Application Priority Data

Oct. 30, 2020 (JP) .................... 2020-183013
Nov. 12, 2020 (JP) .................... 2020-188816

(51) Int. Cl.
*C09D 11/322* (2014.01)
*C09D 11/101* (2014.01)
(Continued)

(52) U.S. Cl.
CPC ............ *C09D 11/322* (2013.01); *C09D 11/36* (2013.01); *C09D 11/38* (2013.01)

(58) Field of Classification Search
CPC .......................... C09D 11/101; C09D 11/322
See application file for complete search history.

(56) References Cited

U.S. PATENT DOCUMENTS 5,322,560 A * 6/1994 DePue .................... C09C 1/644
106/14.44
2009/0258251 A1 10/2009 Abe et al.
(Continued)

FOREIGN PATENT DOCUMENTS

EP 2 682 272 A1 1/2014
EP 3 425 013 A1 1/2019
(Continued)

OTHER PUBLICATIONS

English translation of JP2019-172871A to Hamanaka, "Ink Composition"; translation retrieved via worldwide.espacenet.com on Jun. 27, 2025; 31pp.*
(Continued)

*Primary Examiner* — Shelby L Fidler
(74) *Attorney, Agent, or Firm* — Oliff PLC (57) ABSTRACT

An ink composition has a high storage stability such that decomposition of the components contained in the ink composition can be minimized. This ink composition, which is discharged by using the inkjet method, contains a luminescent pigment, and the amount of hydrogen generated per 100 g of the ink composition measured in a room temperature and normal pressure environment is 1 mL or less. The ink composition may be an active energy ray-curable ink composition or a non-aqueous ink composition containing an organic solvent.

12 Claims, 1 Drawing Sheet

(51) Int. Cl.
*C09D 11/36* (2014.01)
*C09D 11/38* (2014.01)

(56) References Cited

U.S. PATENT DOCUMENTS

| | | | |
|---|---|---|---|
| 2010/0026751 A1 | 2/2010 | Oyanagi | |
| 2010/0036036 A1 | 2/2010 | Oyanagi | |
| 2010/0251929 A1 | 10/2010 | Kagata et al. | |
| 2012/0249666 A1 | 10/2012 | Maki et al. | |
| 2013/0058988 A1* | 3/2013 | Winkelmann | C09C 1/62 106/404 |
| 2014/0168326 A1* | 6/2014 | Nariai | C09D 11/32 347/86 |
| 2015/0112003 A1 | 4/2015 | Toyoda et al. | |
| 2016/0244627 A1* | 8/2016 | Aoki | C09D 11/322 |
| 2017/0058138 A1 | 3/2017 | Kida et al. | |
| 2020/0270461 A1 | 8/2020 | Kainou et al. | |

FOREIGN PATENT DOCUMENTS

| | | |
|---|---|---|
| JP | S53-045331 A | 4/1978 |
| JP | 2002-121423 A | 4/2002 |
| JP | 2003-041150 A | 2/2003 |
| JP | 2006-199920 A | 8/2006 |
| JP | 2007-126643 A | 5/2007 |
| JP | 2011-140609 A | 7/2011 |
| JP | 2011-157516 A | 8/2011 |
| JP | 2012-162638 A | 8/2012 |
| JP | 2012-172090 A | 9/2012 |
| JP | 2012-207119 A | 10/2012 |
| JP | 2013-064053 A | 4/2013 |
| JP | 2014-141587 A | 8/2014 |
| JP | 2015-067767 A | 4/2015 |
| JP | 2015-108110 A | 6/2015 |
| JP | 2016-221771 A | 12/2016 |
| JP | 2017-043722 A | 3/2017 |
| JP | 2019-172871 A | 10/2019 |
| JP | 2020-132998 A | 8/2020 |
| JP | 6754882 B1 | 9/2020 |
| WO | 03/014228 A1 | 2/2003 |
| WO | 2006/066825 A2 | 6/2006 |
| WO | 2016/190442 A1 | 12/2016 |

OTHER PUBLICATIONS

Jul. 27, 2021 Notice of Reasons for Refusal issued in Japanese Patent Application No. 2021-069825.
Nov. 24, 2021 Notice of Reasons for Refusal issued in Japanese Patent Application No. 2021-177792.
Nov. 30, 2021 Notice of Reasons for Refusal issued in Japanese Patent Application No. 2021-069825.
Jan. 11, 2022 Notice of Reasons for Refusal issued in Japanese Patent Application No. 2021-177792.
Oct. 14, 2022 Written Opposition issued in Japanese Patent Application No. 7038268.
Oct. 14, 2022 Written Opposition issued in Japanese Patent Application No. 7038248.
Jan. 19, 2023 Notice of Reasons for Revocation in Japanese Patent Application No. 7038268.
Jan. 19, 2023 Notice of Reasons for Revocation in Japanese Patent Application No. 7038248.
Kanayama, Makoto. "Report 1(In Example 9 of JP 2019-172871 A Hydrogen generation amount of ink composition)", 2 pages, Sep. 8, 2022.
Kanayama, Yu. "Report 2 (In Example 2 of JP 2015-67767 A Hydrogen generation amount of ink composition)", 2 pages, Sep. 8, 2022.
Hashizume, Yoshiki. "Recent Development Trend of Aluminum Pigment". Japan Society of Colour Material, vol. 83, No. 4, pp. 164-170, Apr. 15, 2010.
"Hydrophobic Polymers," https://www.sigmaaldrich.com/JP/ja/products/materials-science/biomedical-materials/hydrophobic-polymers, Sep. 4, 2022, 5 pages.
"Properties and Reactions of Esters," https://sci-pursuit.com/chem/organic/ester.html, Sep. 4, 2022, 10 pages.
Aug. 1, 2024 Extended Search Report issued in European Patent Application No. 21886399.1.

* cited by examiner

INK COMPOSITION

TECHNICAL FIELD

The present invention relates to an ink composition which is mainly discharged by an inkjet method and is used for brilliant decorative printing.

BACKGROUND ART

In recent years, a variety of printed matters in small lots have been increasing, and an inkjet printing method which is an on-demand print has attracted attention as an alternative to a conventional offset printing method. The ink jet printing method is simpler than the conventional off-set printing methods, and has advantages such as economic efficiency and energy saving. The inkjet method is a printing method in which after small droplets of ink discharged from a printer head reach a recording medium, they are fixed by drying, curing, permeation and the like to form dots, and a large number of dots described above gather to form an image.

An image with a metallic tone is sometimes expressed on an adherend such as a substrate (recording medium) or a printed matter in which a coloring layer is formed on a part or the whole of the surface thereof. As a method for providing such metallic gloss, for example, application of an ink including metal powders produced from brass, aluminum microparticles, or the like, foil stamping using metal foil, or heat transfer printing system using metal foil has been used.

Recently, in addition to the above-mentioned methods of forming a coating film having metallic gloss, many examples of application to inkjet system printing methods can be seen, and one of them is brilliant decoration printing. Brilliant decoration printing using an inkjet system is mainly performed using an inkjet printer or the like.

For example, Patent Document 1 discloses a non-aqueous ink composition which contains a brilliant pigment and a predetermined organic solvent. According to Patent Document 1, a recorded product with a metallic glossy image which is excellent in abrasion resistance is obtained from the non-aqueous ink composition described above.

Patent Document 1: Japanese Unexamined Patent Application, Publication No. 2012-207119

DISCLOSURE OF THE INVENTION

Problems to be Solved by the Invention

An ink composition to be discharged by an inkjet method is filled in an ink container inside an ink cartridge included in an inkjet recording device and is stored for a long period of time.

However, the present inventors' research has revealed that when the ink composition contains a brilliant pigment, the ink may be degraded due to the brilliant pigment. It has been found that in particular, when the brilliant pigment contains a metal component, the ink composition may be degraded by the oxidation of the metal component or the gloss of a printed matter may deteriorate.

An object of the present invention is to provide an ink composition which can suppress the degradation of components included in the ink composition and has high storage stability.

Means for Solving the Problems

In order to solve the problem described above, the present inventors have conducted a thorough study to find that it is possible to solve the problem described above by use of an ink composition in which the amount of hydrogen generated is within a predetermined amount as measured under the environment of normal pressure at room temperature, with the result that the present invention has been completed.

Specifically, the present invention provides the followings.

(1) An ink composition to be discharged by an inkjet method, the ink composition including a brilliant pigment, the amount of hydrogen generated from 100 g of the ink composition being 1 ml or less, as measured under the environment of normal pressure at room temperature.

(2) The ink composition as described in aspect (1), in which the ink composition is an active energy ray-curable ink composition.

(3) The ink composition as described in aspect (1), in which the ink composition is a non-aqueous ink composition containing an organic solvent.

(4) The ink composition as described in any one of aspects (1) to (3), in which the brilliant pigment is a metal-containing brilliant pigment.

(5) The ink composition as described in aspect (4), in which the metal-containing brilliant pigment contains aluminum and/or indium.

(6) A recording method including: discharging an ink composition by an inkjet method, the ink composition containing a metal-containing brilliant pigment, the amount of hydrogen generated from 100 g of the ink composition being 1 ml or less, as measured under the environment of normal pressure at room temperature.

(7) A method for manufacturing a printed matter including: discharging an ink composition by an inkjet method, the ink composition containing a brilliant pigment, the amount of hydrogen generated from 100 g of the ink composition being 1 ml or less, as measured under the environment of normal pressure at room temperature.

(8) A method for inspecting an ink composition to be discharged by an inkjet method, the ink composition containing a brilliant pigment, and
the method comprising rating the ink composition as good when an amount of hydrogen generated per 100 g of the ink composition is 1 ml or less as measured under the environment of normal pressure at room temperature.

Effects of the Invention

According to the present invention, it is possible to provide an ink composition which can suppress the degradation of components and has high storage stability.

PREFERRED MODE FOR CARRYING OUT THE INVENTION

Although a specific embodiment of the present invention will be described in detail below, the present invention is not limited to the embodiment below at all, and the present invention can be changed as necessary and practiced without departing from the spirit of the present invention.

<1. Outline>

An ink composition of the present invention is an ink composition which is discharged by an inkjet method. When the ink composition is discharged to an adherend by the inkjet method, a brilliant layer containing a brilliant pigment is formed on the surface of the adherend, and thus it is possible to provide a metallic gloss to the adherend. In the present specification, the adherend may be the surface of a recording medium itself or may be the surface of the recording medium in which a coloring layer or a primer layer is formed on a part or the entirety of the surface of the recording medium, and the adherend is not particularly limited. Although a detailed description will be given later, the "coloring layer" in the present specification means a layer which contains a colorant (dye/pigment) used in a normal ink composition different from a brilliant pigment.

The ink composition of the present invention is characterized in that the amount of hydrogen generated from 100 g thereof is 1 ml or less as measured under the environment of normal pressure at room temperature. The brilliant pigment is particles which are mainly formed of metal such as aluminum or a metal oxide thereof. However, the present inventors' research has revealed that the metal such as aluminum is easily oxidized, and when the metal included in the brilliant pigment of the ink composition is oxidized, hydrogen is generated.

Hence, if the ink composition, 100 of which generates hydrogen of 1 ml or less, is used, the degradation of components included in the ink composition is suppressed, with the result that it is possible to maintain metallic brilliant provided to the adherend.

The ink composition in which the amount of hydrogen generated from 100 g of the ink composition is equal to or less than 0.8 ml is preferable, and the ink composition in which the amount of hydrogen generated from 100 g of the ink composition is equal to or less than 0.6 ml is more preferable.

As a method for measuring the amount of hydrogen generated from 100 g of the ink composition, a method using a detector tube for hydrogen detection (for example, KITAGAWA Gas Detector Tube 137U type made by KOMYO RIKAGAKU KOGYO K.K.) is mentioned. Specifically, 25 g of the ink composition and 200 ml of dried air are put into a sample bag and are sealed, and are stored at 60° C. for 24 hours. Then, after the storage, 20 ml of the gas is sampled from the sample bag, and the amount of hydrogen can be determined according to JIS K 0804 by a gas extractor equipped with the detector tube for hydrogen.

The ink composition of the present invention may be an active energy ray-curable ink composition which contains a polymerizable compound or a non-aqueous ink composition which contains a solvent and does not contain water. As the embodiment of the present invention, each of the active energy ray-curable ink composition and the non-aqueous ink composition will be described below.

<2-1. Active Energy Ray-Curable Ink Composition>

The active energy ray-curable ink composition is an ink composition which contains a polymerizable compound. The polymerizable compound is a compound which has an ethylenically unsaturated double bond and is polymerized by the application of active energy rays of electromagnetic waves such as far ultraviolet rays, ultraviolet rays, near ultraviolet rays, visible rays, infrared rays, X-rays or γ rays, electron rays, proton rays and neutron rays.

The ink composition according to the present embodiment is discharged to the surface of the adherend by the inkjet method. Then, the active energy rays are applied to the ink composition discharged to the surface of the adherend, and thus the polymerizable compound is polymerized. In this way, the ink composition discharged to the surface of the adherend is cured to be a brilliant layer. Here, a brilliant pigment included in the ink composition becomes the brilliant pigment of the brilliant layer, and the polymerizable compound included in the ink composition becomes the resin of the brilliant layer.

Since the active energy ray-curable ink composition according to the present embodiment uses the brilliant pigment which can reduce the generation of hydrogen, it is possible to suppress the degradation of components such as a polymerization initiator included in the ink composition. Since it is also possible to suppress the discoloration of the brilliant pigment, it is possible to maintain the metallic brilliant provided to the adherend.

The components included in the active energy ray-curable ink composition according to the present embodiment will be individually described below.

[Brilliant Pigment]

The brilliant pigment has the function of providing the metallic gloss to the adherend. Examples of the brilliant pigment include pigments which include a pearl pigment and a metal-containing brilliant pigment. Among them, the brilliant pigment preferably contains the metal-containing brilliant pigment. In this way, it is possible to provide further suitable metallic gloss to the adherend.

When the brilliant pigment contains the metal-containing brilliant pigment, the content of the metal-containing brilliant pigment in the total amount of brilliant pigment is more preferably equal to or greater than 30% by mass, more preferably equal to or greater than 50% by mass and further preferably equal to or greater than 70% by mass.

In particular, the brilliant pigment is preferably the metal-containing brilliant pigment. Since the metal-containing brilliant pigment includes metal which is easily oxidized, hydrogen is easily generated. Hence, in the ink composition containing the metal-containing brilliant pigment as the brilliant pigment, the problem to be solved in the present invention occurs particularly easily. Since the ink composition according to the present embodiment uses the brilliant pigment which can reduce the generation of hydrogen, it is possible to have the effect of the present invention capable of suppressing the degradation of the components while achieving the effect of providing further suitable metallic gloss to the adherend.

Examples of the pearl pigment include pigments which have the pearl gloss and interference gloss of mica, fish scale foil, bismuth oxychloride, silicon dioxide, a metal oxide, a metal compound, multilayers thereof and the like.

As the metal-containing brilliant pigment, at least one type of single metals such as aluminum, silver, gold, nickel, chromium, tin, zinc, indium, titanium and copper, a metal compound, an alloy and a mixture thereof is mentioned. As the metal-containing brilliant pigment, a metal-containing brilliant pigment which includes aluminum and/or indium is preferably used. As the brilliant pigment, a brilliant pigment which includes aluminum and/or indium is used, and thus it is possible to provide further suitable metallic gloss to the adherend. In particular, aluminum is easily oxidized as compared with other metals, and thus in the ink composition containing aluminum, the problem to be solved in the present invention occurs particularly easily. Since the ink composition according to the present embodiment uses the brilliant pigment which can reduce the generation of hydrogen, it is particularly possible to have the effect of the present invention capable of suppressing the degradation of the components while achieving the effect of providing further suitable metallic gloss to the adherend.

Although the lower limit of the content of the brilliant pigment is not particularly limited, the content in the total amount of ink composition is equal to or greater than 0.3% by mass. In this way, it is possible to provide further suitable metallic gloss to the adherend. Although the upper limit of the content of the brilliant pigment is not particularly limited, the content in the total amount of ink composition is equal to or less than 5.0% by mass. In this way, the dispersibility of the brilliant pigment in the ink composition or a dispersion liquid is enhanced.

Preferably, the volume-based 50% cumulative particle size (D50) (which may be referred to as a volume average particle size or a median size) of the metal-containing brilliant pigment is equal to or greater than 0.01 μm and equal to or less than 3.0 μm, and the volume-based 90% cumulative particle size (D90) is equal to or less than 4.5 μm and the thickness is equal to or greater than 10 nm and equal to or less than 1.0 μm. By providing the shape as described above, it is possible to provide further suitable metallic gloss to the adherend.

The lower limit of the volume-based 50% cumulative particle size (D50) (which may be referred to as the volume average particle size or the median size) of the metal-containing brilliant pigment is more preferably equal to or greater than 0.02 μm and further preferably equal to or greater than 0.03 μm. The upper limit of the volume-based 50% cumulative particle size (D50) (which may be referred to as the volume average particle size or the median size) of the metal-containing brilliant pigment is more preferably equal to or less than 2.7 μm and further preferably equal to or less than 2.5 μm. The volume-based 90% cumulative particle size (D90) of the metal-containing brilliant pigment is more preferably equal to or less than 4.0 μm and further preferably equal to or less than 3.5 μm.

The thickness of the metal-containing brilliant pigment is equal to or greater than 10 nm, and thus the reflectivity and gloss of the metal-containing brilliant pigment are enhanced, with the result that it is possible to provide further suitable metallic gloss to the adherend. The thickness of the metal-containing brilliant pigment is equal to or less than 1.0 μm, and thus the dispersibility of the metal-containing brilliant pigment in the ink composition or the dispersion liquid is enhanced. The lower limit of the thickness of the metal-containing brilliant pigment is more preferably equal to or greater than 15 nm and further preferably equal to or greater than 20 nm. The upper limit of the thickness of the metal-containing brilliant pigment is more preferably equal to or less than 0.8 μm and further preferably equal to or less than 0.5 μm.

In particular, the volume-based 50% cumulative particle size (D50) (which may be referred to as the volume average particle size or the median size) of the metal-containing brilliant pigment is equal to or greater than 0.03 μm, and the thickness of the metal-containing brilliant pigment is equal to or greater than 20 nm, thus the surface area of the metal-containing brilliant pigment is decreased and therefore the oxidation of the metal-containing brilliant pigment can be suppressed, with the result that it is possible to effectively suppress the generation of hydrogen.

The volume-based 50% cumulative particle size (D50) (which may be referred to as the volume average particle size or the median size), the volume-based 90% cumulative particle size (D90) and the thickness of the brilliant pigment can be measured with "FPIA-3000S" made by Sysmex Corporation, laser diffraction particle size distribution analyzer "SALD 7500nano" made by Shimadzu Corporation, a scanning electron microscope (SEM) and the like.

The brilliant pigment can be obtained by mechanically shaping metal-containing particles, for example, by performing grinding in a ball mill or attrition mill. The metal-containing particles can also be obtained by a known atomization method.

As another method for manufacturing the brilliant pigment, it is possible to pulverize a metal-containing thin film formed on the base material. Examples of the method as described above include a method of forming a metal-containing thin film of about 10 nm or more and 1.0 μm or less on a flat base material coated with a separation resin layer by vacuum deposition, ion plating, sputtering or the like, separating the metal-containing thin film from the base material and pulverizing the metal-containing thin film. The term "metal-containing thin film" is used as a concept including a metal compound-containing thin film such as a metal oxide. The lower limit of the thickness of the metal-containing thin film is more preferably equal to or greater than 15 nm and further preferably equal to or greater than 20 nm. The upper limit of the thickness of the metal-containing thin film is more preferably equal to or less than 0.9 μm and further preferably equal to or less than 0.8 μm.

Specific examples of the base material used in the manufacturing of the brilliant pigment include: a polytetrafluoroethylene film; a polyethylene film; a polypropylene film; polyester films of polyethylene terephthalate and the like; polyamide films of 66 nylon, 6 nylon and the like; a polycarbonate film; a triacetate film; and a polyimide film. A preferred base material is a film of polyethylene terephthalate or its copolymer.

Although the lower limit of the preferred thickness of the base material used in the manufacturing of the brilliant pigment is not particularly limited, the lower limit is preferably equal to or greater than 10 μm, more preferably equal to or greater than 15 μm and further preferably equal to or greater than 20 μm. The thickness of the base material is equal to or greater than 10 μm, and thus the handleability thereof is satisfactory. Although the upper limit of the preferred thickness of a sheet-shaped base material is not particularly limited, the upper limit is preferably equal to or less than 150 μm, more preferably equal to or less than 145 μm and further preferably equal to or less than 140 μm. The thickness of the base material is equal to or less than 150 μm, and thus the flexibility of a printed matter is enhanced, with the result that it is easy to roll and separate the printed matter.

Specific examples of the resin used for the separation resin layer with which the base material is coated include polyvinyl alcohol, polyvinyl butyral, polyethylene glycol, polyacrylic acid, polyacrylamide, a cellulose derivative, polyvinyl acetal, an acrylic acid copolymer and a modified nylon resin. In order to form the resin used for the separation resin layer into a resin layer, the separation resin layer is formed by the application of a resin solution on the sheet-shaped base material such as gravure application, roll application, blade application, extrusion application, dip application or spin coat application.

Although the lower limit of the thickness of the separation resin layer is not particularly limited, the lower limit is preferably equal to or greater than 0.1 μm, more preferably equal to or greater than 0.3 μm and further preferably equal to or greater than 0.5 μm. The lower limit is equal to or greater than 0.1 μm, and thus it is possible to easily separate the metal-containing thin film from the base material. Although the upper limit of the thickness of the separation resin layer is not particularly limited, the upper limit is preferably equal to or less than 50 μm, more preferably equal to or less than 30 μm and further preferably equal to or less than 10 μm. The upper limit is equal to or less than 50 μm, and thus it is possible to easily separate the metal-containing thin film from the base material.

The ink composition and the dispersion liquid used in the manufacturing of the ink composition may be manufactured from the base material on which the metal-containing thin film is formed. Preferably, the brilliant pigment is immersed in a solvent which can dissolve the separation resin and does not react with the brilliant pigment or is subjected to ultrasonic treatment simultaneously with the immersion. Examples of the solvent as described above include the polymerizable compound of the ink composition, a solvent and the like. The separation resin has the function of serving as a dispersant for dispersing the brilliant pigment, and thus the dispersibility of the brilliant pigment is enhanced. In this case, the particle size of the brilliant pigment and the film thickness are adjusted by conditions under which the metal-containing thin film is formed and an ultrasonic dispersion time. The brilliant pigment may be sedimented and separated from the separation resin dissolving solution by centrifugation so as to be recovered, and the brilliant pigment may be dispersed in the polymerizable compound of the ink composition, a solvent or the like.

On the surface of the brilliant pigment, a protective layer may be formed (applied). The protective layer is preferably a non-metallic protective layer. As the non-metallic protective layer, for example, a layer which is formed of a resin or a hydrophobic compound such as a fatty acid compound is mentioned. Examples thereof include fatty acid, fatty acid ester, aromatic carboxylic acid, aromatic carboxylic acid ester, phosphate ester, silicon-containing polymer, fluorine-containing polymer, polyester resin, acrylic resin, epoxy resin, urethane resin, cellulose ester resin and the like. The protective layer is formed on the surface of the brilliant pigment, and thus the oxidation of the brilliant pigment can be suppressed, with the result that it is possible to effectively suppress the generation of hydrogen. In this way, the degradation of the components included in the ink composition is suppressed, and thus the ink composition having higher storage stability is obtained. In particular, when the brilliant pigment contains aluminum, the protective layer is preferably formed of a hydrophobic compound. Examples of the hydrophobic compound include compounds which have the structures of an alkyl group having 4 or more carbon atoms, an aromatic group, a trifluoro group and the like and are not dissolved in water, polyester resin, acrylic resin, epoxy resin, urethane resin, cellulose ester resin and the like. When the brilliant pigment contains aluminum, the protective layer formed of the hydrophobic compound is provided on the surface, and thus the oxidation can be suppressed, with the result that it is possible to effectively suppress the generation of hydrogen.

[Polymerizable Compound]

The polymerizable compound is a compound which is polymerized by the application of active energy rays and has an ethylenically unsaturated double bond. Examples of the active energy rays include electromagnetic waves such as far ultraviolet rays, ultraviolet rays, near ultraviolet rays, visible rays, infrared rays, X-rays and γ rays.

The polymerizable compound may be a monofunctional polymerizable compound which has one ethylenically unsaturated double bond in the compound or may be a polyfunctional polymerizable compound which has two or more ethylenically unsaturated double bonds in the compound. The polymerizable compound is a concept which includes compounds called oligomers and polymers depending on the molecular weight thereof.

Examples of the monofunctional monomer include tetrahydrofurfuryl acrylate (THFA), trimethylolpropane formal acrylate (CTFA), (2-methyl-2-ethyl-1,3-dioxolan-4-yl) acrylate, (2-methyl-2-isobutyl-1,3-dioxolan-4-yl) (meth)acrylate, (cyclohexanespiro-2-(1,3-dioxolan-4-yl)) (meth)acrylate, 4-t-butylcyclohexyl acrylate which is alkylcycloalkyl acrylate, benzyl acrylate, 2-phenoxyethyl acrylate, isobornyl acrylate, dicyclopentanyl acrylate, dicyclopentenyl acrylate, dicyclopentenyloxyethyl acrylate, γ-butyrolactone acrylate, cresol acrylate, 2-acryloyloxyethyl phthalate, 2-acryloyloxyethyl-2-hydroxyethyl phthalate, 2-acryloyloxyethyl hexahydrophthalate, 2-acryloyloxypropyl phthalate, paracumylphenoxyethylene glycol acrylate, nonylphenoxypolyethylene glycol acrylate, 1-adamantyl acrylate, cyclohexyl acrylate, 3-3-5-trimethylcyclohexyl acrylate, 2-hydroxy-3-phenoxypropyl acrylate, acryloylmorpholine, N-vinylcaprolactam, imido acrylate, isooctyl acrylate, tridecyl acrylate, lauryl acrylate, hydroxyethyl acrylate, stearyl acrylate, isodecyl acrylate, caprolactone acrylate, methoxypolyethylene glycol acrylate, methoxypolypropylene glycol acrylate, 2-methoxyethyl acrylate, ethylcarbitol acrylate, 2-ethylhexyl acrylate and these acrylates which have various modifications such as alkoxy modification and caprolactone modification.

Examples of the polyfunctional monomers include ethylene glycol di(meth)acrylate, diethylene glycol di(meth)acrylate, dipropylene glycol di(meth)acrylate, tripropylene glycol di(meth)acrylate, hexanediol di(meth)acrylate, long-chain aliphatic di(meth)acrylate, 1,4-butanediol di(meth)acrylate, 1,6-hexanediol di(meth)acrylate, 1,9-nonanediol di(meth)acrylate, neopentyl glycol di(meth)acrylate, hydroxypivalic acid neopentyl glycol di(meth)acrylate, stearic acid-modified pentaerythritol di(meth)acrylate, propylene glycol di(meth)acrylate, glycerol di(meth)acrylate, triethylene glycol di(meth)acrylate, acrylic acid 2-(2-vinyloxyethoxy)ethyl, tetraethylene glycol di(meth)acrylate, tetramethylene glycol di(meth)acrylate, butylene glycol di(meth)acrylate, propoxylated neopentyl glycol di(meth)acrylate, polyethylene glycol di(meth)acrylate, polypropylene di(meth)acrylate, triglycerol di(meth)acrylate, neopentyl glycol-modified trimethylolpropane di(meth)acrylate, allylated cyclohexyl di(meth)acrylate, methoxylated cyclohexyl di(meth)acrylate, acrylated isocyanurate, bis(acryloxy neopentyl glycol) adipate, bisphenol A di(meth)acrylate, tetrabromobisphenol A di(meth)acrylate, bisphenol S di(meth)acrylate, butanediol di(meth)acrylate, phthalate di(meth)acrylate, phosphoric acid di(meth)acrylate, zinc di(meth)acrylate, pentaerythritol tetraacrylate, ditrimethylolpropane tetraacrylate, dipentaerythritol pentaacrylate, dipentaerythritol hexaacrylate, trimethylolpropane tri(meth)acrylate, pentaerythritol tri(meth)acrylate, glycerin tri(meth)acrylate, these (meth)acrylates having different numbers of modifications, different types of modifications and different structures and the like.

[Polymerization Initiator]

The ink composition according to the present embodiment may contain the polymerization initiator as necessary. The polymerization initiator is not particularly limited as long as the polymerization reaction of the polymerizable compound in the ink composition is promoted by the application of the active energy rays. In the ink composition according to the present embodiment, the polymerization initiator is not necessarily essential, and for example, when electron rays are used as the active energy rays, the polymerization initiator does not need to be used.

Specific examples of the polymerization initiator include aromatic ketones including thioxanthone, α-aminoalkylphenones, α-hydroxyketones, acylphosphine oxides, aromatic onium salts, organic peroxide, a thio compound, a hexaarylbiimidazole compound, a ketoxime ester compound, a borate compound, an azinium compound, a metallocene compound, an active ester compound, a compound having a carbon-halogen bond, an alkylamine compound and the like.

The amount of polymerization initiator is preferably an amount which allows the polymerization reaction of the polymerizable compound to be started appropriately, and the content thereof in the total amount of ink composition is preferably equal to or greater than 1.0% by mass and more preferably equal to or greater than 3.0% by mass. The content in the total amount of ink composition is preferably equal to or less than 20.0% by mass, more preferably equal to or less than 18.0% by mass and further preferably equal to or less than 15.0% by mass.

[Polymerization Inhibitor]

The ink composition according to the present embodiment may contain a polymerization inhibitor as necessary. The polymerization inhibitor is not particularly limited, and for example, polymerization inhibitors such as diphenylpicrylhydrazide, tri-p-nitrophenylmethyl, p-benzoquinone, p-tert-butylcatechol, picric acid, copper chloride, methylhydroquinone, methoquinone, tert-butylhydroquinone, phenothiazines and nitrosamines can be used.

[Surface Conditioner]

The ink composition according to the present embodiment may contain a surface conditioner as necessary. Although the surface conditioner is not particularly limited, specific examples thereof include "BYK-306", "BYK-333", "BYK-371" and "BYK-377" made by BYK-Chemie, "TegoRad2010", "TegoRad2100", "TegoRad2200N" and "TegoRad2300" made by Evonik Degussa Japan Co., Ltd., all of which contain dimethylpolysiloxane, and the like.

[Other Additives]

The ink composition according to the present embodiment may contain, as other additives, various additives such as a solvent, a plasticizer, a light stabilizer, an antioxidant and a resin component.

The ink composition according to the present embodiment may contain a colorant (dye/pigment) which is different from the brilliant pigment and is used in an ink composition for a normal inkjet. The content of the colorant in the total amount of ink composition is preferably equal to or less than 3.0% by mass, more preferably equal to or less than 1.0% by mass, further preferably equal to or less than 0.5% by mass and still further preferably equal to or less than 0.2% by mass.

The ink composition according to the present embodiment preferably does not include water. The "does not include water" means that water is not intentionally contained. Hydrogen may be generated due to the interaction between water contained in the ink composition and the brilliant pigment. The ink composition does not include water, and thus it is possible to suppress the amount of hydrogen generated, with the result that it is possible to provide the ink composition which achieves the effect of the present invention.

(Viscosity and Surface Tension of Ink Composition)

In terms of inkjet dischargeability and discharge stability, the viscosity of the ink composition according to the present embodiment at a discharge temperature (for example, 40° C.) is preferably equal to or less than 30 mPa·s, more preferably equal to or less than 25 mPa·s and further preferably equal to or less than 22 mPa·s. The viscosity of the ink composition according to the present embodiment is preferably equal to or greater than 3 mPa·s, more preferably equal to or greater than 5 mPa·s and further preferably equal to or greater than 7 mPa·s. The viscosity of the ink composition according to the present embodiment is preferably adjusted, according to the temperature at which the ink composition is discharged, in the appropriate range of an inkjet head used in an inkjet recording device. The viscosity can be measured with a vibration viscometer, a rheometer, a falling ball viscometer or the like.

In terms of inkjet dischargeability, discharge stability and a leveling property to the base material, the surface tension of the ink composition according to the present embodiment at a discharge temperature (for example, 40° C.) is preferably equal to or greater than 20 mN/m, more preferably equal to or greater than 23 mN/m and further preferably equal to or greater than 25 mN/m. The surface tension of the ink composition according to the present embodiment is preferably equal to or less than 40 mN/m, more preferably equal to or less than 38 mN/m and further preferably equal to or less than 36 mN/m.

(Method for Manufacturing Ink Composition)

A method for manufacturing the ink composition is not particularly limited, and a conventionally known method can be used. For the ink composition, a dispersion machine is used to disperse the polymerizable compound, the brilliant pigment, the dispersant and the like, thereafter the polymerization initiator, the polymerization inhibitor, a leveling agent and the like are added as necessary and are uniformly stirred such that a mixture is obtained, the brilliant pigment is thereafter added and a filter is further used to perform filtration, with the result that the ink composition is obtained.

<2-2. Non-Aqueous Ink Composition>

The non-aqueous ink composition is an ink composition which does not contain water and has an organic solvent as the main component. In the present specification, the "does not contain water" means an ink composition which is intentionally manufactured without water being contained, and no consideration is given to, for example, water which is caused by water or the like contained in water vapor or the like included in the air or additives and is contained due to causes which are not intended by the manufacturer.

The non-aqueous ink composition according to the present embodiment contains an organic solvent and the brilliant pigment, and is discharged to the surface of the adherend by the inkjet method. Then, when the organic solvent in the ink composition volatilizes, the brilliant layer containing the brilliant pigment is formed on the surface of the adherend, and thus it is possible to provide metallic gloss to the adherend.

Since the non-aqueous ink composition according to the present embodiment uses the brilliant pigment which can reduce the generation of hydrogen, it is possible to suppress the degradation of the organic solvent, the resin and the like included in the ink composition. Since it is also possible to suppress the discoloration of the brilliant pigment, it is possible to maintain the metallic gloss provided to the adherend.

As the brilliant pigment included in the non-aqueous ink composition according to the present embodiment, the same type of brilliant pigment as the brilliant pigment included in the active energy ray-curable ink composition described above can be used. The type, the volume-based 50% cumulative particle size (D50), the volume-based 90% cumulative particle size (D90), the thickness and the content of the preferred brilliant pigment are the same as those of the brilliant pigment included in the active energy ray-curable ink composition, and the manufacturing method is also the same.

Components other than the brilliant pigment included in the non-aqueous ink composition will be described below.

[Organic Solvent]

As the organic solvent, the same organic solvent that is contained in a non-aqueous ink composition discharged by a conventional inkjet method can be used. Specific examples thereof include glycol ether dialkyl in which OH groups at both ends of glycol are substituted with an alkyl group, glycol ether monoalkyl in which one of OH groups of glycol is substituted with an alkyl group, carbonate ester and the like.

Examples of the glycol ether dialkyl include glycol ether dialkyl represented by formula (1) below.

[Chem. 1]

(1)

(In formula (1), $R_1$ is an optionally branched alkyl group having 1 to 8 carbon atoms, $R_2$ is an optionally branched alkylene group having 1 to 4 carbon atoms, and $R_3$ is hydrogen or an optionally branched alkyl group having 1 to 8 carbon atoms, and n represents an integer of 1 or more and 4 or less.)

$R_1$ is preferably an optionally branched alkyl group having 1 to 4 carbon atoms. $R_2$ is preferably an optionally branched alkylene group having 1 to 3 carbon atoms. $R_3$ is hydrogen or an optionally branched alkyl group having 1 to 4 carbon atoms.

Examples of the organic solvent represented by formula (1) include: alkylene glycol monoalkyl ethers such as ethylene glycol mono-n-butyl ether, ethylene glycol mono-isobutyl ether, ethylene glycol mono-t-butyl ether, ethylene glycol mono-2-ethylhexyl ether, diethylene glycol monomethyl (or ethyl, propyl, isopropyl, n-butyl, isobutyl, t-butyl or 2-ethylhexyl) ether, triethylene glycol monomethyl (or ethyl, propyl, isopropyl, n-butyl, isobutyl, t-butyl or 2-ethylhexyl) ether, tetraethylene glycol monomethyl ether, propylene glycol mono-n-butyl ether, propylene glycol mono-isobutyl ether, propylene glycol mono-t-butyl ether, propylene glycol mono-2-ethylhexyl ether, dipropylene glycol monomethyl (or ethyl, propyl, isopropyl, n-butyl, isobutyl, t-butyl or 2-ethylhexyl) ether, tripropylene glycol monomethyl (or ethyl, propyl, isopropyl, n-butyl, isobutyl or t-butyl) ether and tetrapropylene glycol monomethyl ether (or ethyl, propyl, isopropyl, n-butyl, isobutyl, t-butyl or 2-ethylhexyl); and dialkyl ethers of polyhydric alcohols such as ethylene glycol dibutyl ether, ethylene glycol dipropyl ether, diethylene glycol dimethyl ether, diethylene glycol diethyl ether, diethylene glycol methyl ethyl ether, diethylene glycol dipropyl ether, diethylene glycol propyl methyl ether, diethylene glycol dibutyl ether, diethylene glycol butyl methyl ether, diethylene glycol butyl ethyl ether, diethylene glycol methyl-2-ethylhexyl ether, triethylene glycol dimethyl ether, triethylene glycol diethyl ether, triethylene glycol ethyl methyl ether, tetraethylene glycol dimethyl ether, tetraethylene glycol diethyl ether, tetraethylene glycol ethyl methyl ether, propylene glycol diethyl ether, propylene glycol ethyl methyl ether, propylene glycol methyl propyl ether, propylene glycol methyl butyl ether, propylene glycol methyl-2-ethylhexyl ether, dipropylene glycol dimethyl ether, dipropylene glycol diethyl ether, dipropylene glycol ethyl methyl ether, dipropylene glycol methyl propyl ether, dipropylene glycol dipropyl ether, dipropylene glycol methyl butyl ether, tripropylene glycol dimethyl ether, tripropylene glycol diethyl ether and tripropylene glycol ethyl methyl ether.

In terms of permeation into the base material to which the non-aqueous ink composition is discharged, the leveling property on the surface of the base material and drying, preferred examples include diethylene glycol dimethyl ether, diethylene glycol diethyl ether, diethylene glycol ethyl methyl ether, diethylene glycol dipropyl ether, diethylene glycol propyl methyl ether, diethylene glycol dibutyl ether, diethylene glycol butyl methyl ether, diethylene glycol butyl ethyl ether, diethylene glycol methyl-2-ethylhexyl ether, triethylene glycol dimethyl ether, triethylene glycol diethyl ether, triethylene glycol ethyl methyl ether, tetraethylene glycol dimethyl ether, propylene glycol diethyl ether, propylene glycol ethyl methyl ether, propylene glycol methyl propyl ether, propylene glycol methyl butyl ether, propylene glycol methyl-2-ethylhexyl ether, dipropylene glycol dimethyl ether, dipropylene glycol diethyl ether, dipropylene glycol ethyl methyl ether, dipropylene glycol methyl propyl ether, dipropylene glycol dipropyl ether, tripropylene glycol dimethyl ether and tripropylene glycol ethyl methyl ether.

An organic solvent in which two or more of these are mixed may be used. Examples thereof include a non-aqueous ink composition which contains a first organic solvent having a flash point of 70° C. or less and represented by general formula (1) and a second organic solvent having a flash point of 90° C. or more and represented by formula (1). The first organic solvent and the second organic solvent as described above are contained, and thus the drying of the non-aqueous ink composition and the wetting and spreading properties of the non-aqueous ink composition in the base material are satisfactory, with the result that it is possible to provide further suitable metallic gloss to the adherend.

Examples of the first organic solvent include diethylene glycol methyl ethyl ether, diethylene glycol dimethyl ether, dipropylene glycol dimethyl ether and diethylene glycol isopropyl methyl ether. Examples of the second organic solvent include diethylene glycol diethyl ether, diethylene glycol butyl methyl ether, tetraethylene glycol monobutyl ether, diethylene glycol monomethyl ether, diethylene glycol monoethyl ether, diethylene glycol monoisopropyl ether, diethylene glycol monohexyl ether, diethylene glycol dibutyl ether, dipropylene glycol monopropyl ether, dipropylene glycol monobutyl ether, triethylene glycol monomethyl ether, triethylene glycol monobutyl ether, triethylene glycol dimethyl ether, tripropylene glycol monomethyl ether, tripropylene glycol monobutyl ether, tripropylene glycol dimethyl ether and tetraethylene glycol dimethyl ether.

The organic solvent contained in the non-aqueous ink composition according to the present embodiment may contain organic solvents other than the organic solvents represented by formula (1) below. Examples thereof include the following general organic solvents: alcohols such as methyl alcohol, ethyl alcohol, n-propyl alcohol, isopropyl alcohol and n-butyl alcohol; ketones such as acetone, methyl ethyl ketone, methyl-n-propyl ketone, methyl isopropyl ketone, methyl-n-butyl ketone, methyl isobutyl ketone, methyl-n-amyl ketone, methyl isoamyl ketone, diethyl ketone, ethyl-n-propyl ketone, ethyl isopropyl ketone, ethyl-n-butyl ketone, ethyl isobutyl ketone, di-n-propyl ketone, diisobutyl ketone, cyclohexanone, methylcyclohexanone and isophorone; acetic esters such as methyl acetate, ethyl acetate, n-propyl acetate, isopropyl acetate, n-butyl acetate, isobutyl acetate, hexyl acetate and octyl acetate; lactate esters such as methyl lactate, ethyl lactate, butyl lactate, propyl lactate, ethylhexyl lactate, amyl lactate and isoamyl lactate; glycols such as ethylene glycol, diethylene glycol, triethylene glycol, propylene glycol and dipropylene glycol; acetates such as ethylene glycol butyl ether acetate, diethylene glycol ethyl ether acetate, diethylene glycol methyl ether acetate, diethylene glycol butyl ether acetate, propylene glycol methyl ether acetate, dipropylene glycol methyl ether acetate and 1-methoxy-2-propyl acetate; saturated hydrocarbons such as n-hexane, isohexane, n-nonane, isononane, dodecane and isododecane; unsaturated hydrocarbons such as 1-hexene, 1-heptene and 1-octene; cyclic saturated hydrocarbons such as cyclohexane, cycloheptane, cyclooctane, cyclodecane and decalin; cyclic unsaturated hydrocarbons such as cyclohexene, cycloheptene, cyclooctene, 1,1,3,5,7-cyclooctatetraene and cyclododecene; aromatic hydrocarbons such as benzene, toluene and xylene; terpene-based solvents; ether-based solvents; cyclic imides; and the like.

A heterocyclic compound such as a cyclic ester organic solvent or a cyclic amide organic solvent or an amide organic solvent which includes one carboxylic acid amide structure in its molecular structure and has an ether bond in a linear alkyl structure may be contained.

Examples of the cyclic ester organic solvent include a lactone organic solvent. Examples of the lactone organic solvent include γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone, ε-caprolactone, ethylene carbonate, propylene carbonate and the like. The cyclic ester organic solvent may be a cyclic ester in which two or more types are mixed.

Examples of the cyclic amide organic solvent include α-, β-, γ-, δ- and ε-lactams, 2-pyrrolidone, N,N'-dimethylimidazolidinone, N-methylpyrrolidone, N-ethylpyrrolidone and the like.

Examples of the amide organic solvent include β-methoxypropionamide, β-butoxypropionamide, 3-methoxy-N,N-dimethylpropanamide, 3-butoxy-N,N-dimethylpropanamide, N,N-diethylformamide and the like.

The content of the cyclic ester organic solvent, the cyclic amide organic solvent or the amide organic solvent in the total amount of non-aqueous ink composition is preferably equal to or greater than 5% by mass and more preferably equal to or greater than 10% by mass. The content of the cyclic ester organic solvent, the cyclic amide organic solvent or the amide organic solvent in the total amount of non-aqueous ink composition is preferably equal to or less than 30% by mass and more preferably equal to or less than 20% by mass. The content of the cyclic ester organic solvent is in the range described above, and thus a part of the surface of the adherend (such as the base material and the coloring layer) is dissolved and the non-aqueous ink composition can be more effectively permeated into the adherend.

[Resin]

The non-aqueous ink composition according to the present embodiment may contain a resin (binder resin) as necessary. The non-aqueous ink composition according to the present embodiment contains a resin, and thus it is possible to obtain a printed matter which has a more satisfactory resistance to abrasion. The resin is not particularly limited, and examples of the resin capable of being used include acrylic resin, polystyrene resin, polyester resin, vinyl chloride resin, vinyl acetate resin, vinyl chloride vinyl acetate copolymer resin, polyethylene resin, urethane resin, rosin modified resin, phenol resin, terpene resin, polyamide resin, vinyl toluene-α-methylstyrene copolymer, ethylene-vinyl acetate copolymer, cellulose acetate butyrate, silicone (silicon) resin, acrylamide resin, epoxy resin and copolymer resins and mixtures thereof.

As the non-aqueous ink composition according to the present embodiment, among those described above, the non-aqueous ink composition including acrylic resin is preferable because discharge responsiveness at the time of high-speed printing is enhanced and discharge stability, water resistance and solvent resistance can also be enhanced.

The acrylic resin is not particularly limited as long as the acrylic resin includes (meth)acrylic acid ester monomer as the main component of a monomer. As the (meth)acrylate ester monomer, a known compound can be used, and monofunctional (meth)acrylate ester can be preferably used. Examples thereof include (meth) acrylate alkyl ester, (meth) acrylate aralkyl ester, (meth) acrylate alkoxyalkyl ester and the like. Specific examples thereof include the following (meth)acrylates: methyl (meth)acrylate, ethyl (meth)acrylate, n-propyl (meth)acrylate, iso-propyl (meth)acrylate, n-butyl (meth)acrylate, sec-butyl (meth)acrylate, iso-butyl (meth)acrylate, tert-butyl (meth)acrylate, pentyl (meth)acrylate, neopentyl (meth)acrylate, hexyl (meth)acrylate, 2-ethylhexyl (meth)acrylate, octyl (meth)acrylate, iso-octyl (meth)acrylate, nonyl (meth)acrylate, iso-nonyl (meth)acrylate, dodecyl (meth)acrylate, tridecyl (meth) acrylate, stearyl (meth)acrylate, cyclopentyl (meth)acrylate, cyclohexyl (meth)acrylate, 2-methylcyclohexyl (meth)acrylate, dicyclopentanyl (meth)acrylate, dicyclopentenyl (meth) acrylate, dicyclopentanyloxyethyl (meth)acrylate, dicyclopentenyloxyethyl (meth)acrylate, dicyclohexyl (meth)acrylate, isobornyl (meth)acrylate, adamantyl (meth)acrylate, allyl (meth)acrylate, propargyl (meth)acrylate, phenyl (meth) acrylate, naphthyl (meth)acrylate, anthracenyl (meth)acrylate, anthraninonyl (meth)acrylate, piperonyl (meth)acrylate, salicyl (meth)acrylate, furyl (meth)acrylate, furfuryl (meth)acrylate, tetrahydrofuryl (meth)acrylate, tetrahydrofurfuryl (meth)acrylate, pyranyl (meth) acrylate, benzyl (meth)acrylate, phenethyl (meth)acrylate, cresyl (meth) acrylate, glycidyl (meth)acrylate, 3,4-epoxycyclohexylmethyl (meth)acrylate, 3,4-epoxycyclohexylethyl (meth) acrylate, 1,1,1-trifluoroethyl (meth)acrylate, perfluoroethyl (meth)acrylate, perfluoro-n-propyl (meth)acrylate, perfluoro-iso-propyl (meth)acrylate, heptadecafluorodecyl (meth)acrylate, triphenylmethyl (meth)acrylate, cumyl (meth)acrylate, 3-(N,N-dimethylamino)propyl (meth)acrylate, methoxyethyl (meth)acrylate, ethoxyethyl (meth)acrylate, butoxyethyl (meth)acrylate, 2-cyanoethyl (meth)acrylate, dimethylaminoethyl (meth)acrylate, diethylaminoethyl (meth)acrylate, trimethoxysilylpropyl (meth)acrylate, triethoxysilylpropyl (meth)acrylate, 3-methacryloxypropylmethyldiethoxy silane and the like. The "(meth)acryl" means both "acryl" and "methacryl". These monomers are available from MITSUBISHI RAYON CO., LTD., NOF CORPORATION, Mitsubishi Chemical Corporation, Hitachi Chemical Company, Ltd. and the like.

The monomer of the acrylic resin may include an acid group-containing monomer having an acid group, a hydroxyl group-containing monomer having a hydroxyl group and an amino group-containing monomer having an amino group. Examples of the acid group-containing monomer having an acid group include acrylic acid, methacrylic acid, itaconic acid, fumaric acid, maleic acid, crotonic acid, citraconic acid, maleic anhydride, maleic acid monomethyl ester, maleic acid monobutyl ester, itaconic acid monomethyl ester, itaconic acid monobutyl ester, vinyl benzoic acid, oxalic acid monohydroxyethyl (meth)acrylate and a carboxyl group-containing monomer having an ethylenically unsaturated double bond and a carboxyl group such as a carboxyl group-containing aliphatic monomer like a carboxyl group-terminated caprolactone-modified (meth)acrylate. Although the hydroxyl group-containing monomer having a hydroxyl group is not particularly limited as long as it has an unsaturated double bond and a hydroxyl group, and examples thereof include 2-hydroxyethyl (meth)acrylate, 2-hydroxypropyl (meth)acrylate, 3-hydroxyethyl (meth)acrylate, 3-hydroxypropyl (meth)acrylate, 2-hydroxybutyl (meth)acrylate, 4-hydroxybutyl (meth)acrylate, caprolactone-modified hydroxy (meth)acrylate, methyl α-(hydroxymethyl) (meth)acrylate, ethyl α-(hydroxymethyl) (meth)acrylate, n-butyl α-(hydroxymethyl) (meth)acrylate, 1,4-cyclohexanedimethanol mono (meth)acrylate, 4-hydroxybutyl (meth)acrylate and the like. Although the amino group-containing monomer is not particularly limited as long as it has an unsaturated double bond and an amino group, and examples thereof include acrylamide compounds such as (meth)acrylamide N-monomethyl (meth)acrylamide, N-monoethyl (meth)acrylamide, N,N-dimethyl (meth) acrylamide, N-n-propyl (meth)acrylamide, N-isopropyl (meth)acrylamide, methylene bis (Acrylamide compounds such as meth)acrylamide, N-methylol (meth)acrylamide, N-butoxymethyl (meth)acrylamide, dimethylaminoethyl (meth)acrylamide, N,N-dimethylaminopropylacrylamide and diacetoneacrylamide, nitrogen atom-containing (meth) acrylate compounds such as dimethylaminoethyl (meth) acrylate, diethylaminoethyl (meth)acrylate and ethylene oxide addition (meth)acrylate of morpholine, N-vinylpyrrolidone, N-vinylpyridine, N-vinylimidazole, N-vinylpyrrole, N-vinyloxazolidone, N-vinylsuccinimide, N-vinylmethylcarbamate, N,N-methylvinylacetamide, (meth) acryloyloxy ethyltrimethylammonium chloride, 2-isopropenyl-2-oxazoline, 2-vinyl-2-oxazoline, (meth) acrylonitrile and the like.

The monomer of the acrylic resin may include another monomer as necessary in addition to the (meth) acrylic acid ester monomer described above. The monomer described above is not particularly limited as long as the monomer can be copolymerized with the (meth) acrylic acid ester monomer and has desired water resistance and solvent resistance, and the monomer may be a monofunctional monomer having one ethylenically unsaturated double bond or a polyfunctional monomer having two or more ethylenically unsaturated double bonds. Examples of the monomer capable of being used include: vinyl monomers such as vinyl acetate, vinyl chloride, vinylidene chloride, vinyl fluoride, vinylidene fluoride, N-vinylpyrrolidone, vinylpyridine, N-vinylcarbazole, vinylimidazole, vinyl ether, vinylketone and vinylpyrrolidone; aromatic vinyl monomers such as styrene, α-, o-, m- and p-alkyl, nitro, cyano, amide and ester derivatives of styrene, vinyltoluene and chlorostyrene; olefin monomers such as ethylene, propylene and isopropylene; diene monomers such as butadiene and chloroprene; vinyl cyanide compound monomers such as acrylonitrile and methacrylonitrile; and the like. Examples of the monomer capable of being used also include: diacrylate compounds such as polyethylene glycol diacrylate, triethylene glycol diacrylate and 1,3-butylene glycol diacrylate; triacrylate compounds such as trimethylolpropane triacrylate, trimethylolethane triacrylate and tetramethylolmethane triacrylate; dimethacrylate compounds such as ethylene glycol dimethacrylate, diethylene glycol dimethacrylate and triethylene glycol dimethacrylate; trimethacrylate compounds such as trimethylolpropane trimethacrylate and trimethylolethane trimethacrylate; divinylbenzene; and the like. Although the acrylic resin can be formed from these monomers, the form of copolymerization of the monomers is not particularly limited, and examples of the form capable of being used include block copolymer, random copolymer, graft copolymer and the like.

The acrylic resin may be a homopolymer of one type of radically polymerizable monomer or may be a copolymer obtained by selecting and using two or more types of radically polymerizable monomers, and in particular, the preferred acrylic resin serving as the non-aqueous ink composition according to the present embodiment is a homopolymer of methyl methacrylate or a copolymer of methyl methacrylate and at least one or more selected from the group consisting of butyl methacrylate, ethoxyethyl methacrylate and benzyl methacrylate.

The acrylic resin as described above shows satisfactory compatibility with the organic solvent in the non-aqueous ink composition in particular, and thus it is possible to provide the non-aqueous ink composition having ink storage stability and image reproducibility. The acrylic resin preferably has a mass average molecular weight of 5000 or more. Among those described above, in terms of abrasion resistance and blocking resistance, the acrylic resin used in the non-aqueous ink composition according to the present embodiment preferably has a mass average molecular weight of 10000 or more, more preferably has a mass average molecular weight of 12000 or more and further preferably has a mass average molecular weight of 15000 or more. On the other hand, in terms of high discharge stability during high-speed printing, the acrylic resin used in the non-aqueous ink composition according to the present embodiment preferably has a mass average molecular weight of 100000 or less, more preferably has a mass average molecular weight of 50000 or less, further preferably has a mass average molecular weight of 35000 or less and still further preferably has a mass average molecular weight of 30000 or less. The acrylic resin used in the non-aqueous ink composition according to the present embodiment preferably has a glass transition temperature (Tg) of 80° C. or more and 110° C. or less. The Tg is in the range described above, and thus the effect of obtaining satisfactory print drying is remarkable. Examples of the commercially available (meth)acrylic resin include: "Paraloid B99N" made by Rohm and Haas Company (methyl methacrylate/butyl methacrylate copolymer) having a Tg of 82° C. and a mass average molecular weight of 15,000; "Paraloid B60" made by Rohm and Haas Company (methyl methacrylate/butyl methacrylate copolymer) having a Tg of 75° C. and a mass average molecular weight of 50,000; and the like.

Examples of a vinyl chloride vinyl acetate copolymer resin capable of being used in the non-aqueous ink composition according to the present embodiment include a vinyl chloride vinyl acetate copolymer, a vinyl chloride/vinyl acetate/maleic acid copolymer, a vinyl chloride/vinyl acetate/vinyl alcohol copolymer, a vinyl chloride/vinyl acetate/hydroxyalkyl acrylate copolymer and the like and the mixtures thereof. As the vinyl chloride vinyl acetate copolymer resin described above, products such as "Solbin C (number average molecular weight (Mn) of 31000), CL (Mn of 25000), CNL (Mn of 12000), CLL (Mn of 18000), C5R (Mn of 27000), TA2 (Mn of 33000), TA3 (Mn of 24000), A (Mn of 30000), AL (Mn of 22000), TA5R (Mn of 28000) and M5 (Mn of 32000) made by Nissin Chemical Co., ltd. are available.

In the non-aqueous ink composition according to the present embodiment, the content (% by mass) of the resin included in 100% by mass of the non-aqueous ink composition is not particularly limited. In particular, the lower limit of the content of the resin in the total amount of non-aqueous ink composition is preferably equal to or greater than 0.05% by mass, more preferably equal to or greater than 0.1% by mass and further preferably equal to or greater than 0.5% by mass. The upper limit of the content of the resin in the total amount of non-aqueous ink composition is preferably equal to or less than 5.0% by mass, more preferably equal to or less than 3.0% by mass and particularly preferably equal to or less than 2.0% by mass.

[Other Additives]

The non-aqueous ink composition according to the present embodiment may contain, as other additives, various additives such as a viscosity adjuster, a pH adjuster, a defoamer, an antioxidant, an antiseptic, an antifungal agent, a charge adjuster, a wetting agent and a wax.

The non-aqueous ink composition according to the present embodiment may contain a colorant (dye/pigment) which is different from the brilliant pigment and is used in a non-aqueous ink composition for a normal inkjet. The content of the colorant in the total amount of non-aqueous ink composition is preferably equal to or less than 3.0% by mass, more preferably equal to or less than 1.0% by mass, further preferably equal to or less than 0.5% by mass and still further preferably equal to or less than 0.2% by mass.

(Viscosity and Surface Tension of Non-Aqueous Ink Composition)

In terms of inkjet dischargeability and discharge stability, the viscosity of the non-aqueous ink composition according to the present embodiment at a temperature of 25° C. is preferably equal to or less than 30 mPa·s, more preferably equal to or less than 20 mPa·s and further preferably equal to or less than 15 mPa·s. The viscosity of the non-aqueous ink composition according to the present embodiment is preferably equal to or greater than 3 mPa·s, more preferably equal to or greater than 4 mPa·s and further preferably equal to or greater than 5 mPa·s.

In terms of inkjet dischargeability, discharge stability and the leveling property to the base material, the surface tension of the non-aqueous ink composition according to the present embodiment at a temperature of 25° C. is preferably equal to or greater than 20 mN/m, more preferably equal to or greater than 22 mN/m and further preferably equal to or greater than 24 mN/m. The surface tension of the non-aqueous ink composition according to the present embodiment is preferably equal to or less than 40 mN/m, more preferably equal to or less than 37 mN/m and further preferably equal to or less than 35 mN/m.

(Method for Manufacturing Non-Aqueous Ink Composition)

As a method for manufacturing the non-aqueous ink composition according to the present embodiment, a method for manufacturing the non-aqueous ink composition by mixing the brilliant pigment and the organic solvent is mentioned.

Examples thereof include: a method of preparing the non-aqueous ink composition by adding the organic solvent and the brilliant pigment and a resin, a surfactant and the like as necessary; a method of preparing the non-aqueous ink composition by adding the brilliant pigment and a dispersant to the organic solvent and dispersing them and thereafter adding a resin, a surfactant and another component as necessary; a method of preparing the non-aqueous ink composition by adding the brilliant pigment, a resin and a surfactant and another component as necessary to the organic solvent and thereafter dispersing the brilliant pigment; and the like.

A printed matter obtained by the active energy ray-curable ink composition and the non-aqueous ink composition will be described next.

<3. Printed Matter>

The printed matter obtained by using the ink composition according to the embodiment described above includes the base material (recording medium) and the brilliant layer formed on the surface of the base material (recording medium). The brilliant layer contains the brilliant pigment contained in the ink composition according to the embodiment described above, and thus it is possible to provide metallic gloss to the adherend.

Since the ink composition uses the brilliant pigment which can reduce the generation of hydrogen, it is possible to maintain the metallic gloss provided to the adherend.

The individual layers of the printed matter will be described below.

[Base Material (Recording Medium)]

The base material (recording medium) is not particularly limited, the base material (recording medium) may be a non-absorbent base material such as a resin base material or a metal sheet glass, may be an absorbent base material such as paper or woven fabric or may be a base material such as a base material having a receptive layer on which surface coating is performed and thus, various base materials can be used.

Examples of the non-absorbent base material include resin base materials such as polyester resin, polypropylene synthetic paper, vinyl chloride resin and polyimide resin, metal, metal foil coated paper, glass, synthetic rubber, natural rubber and the like.

Examples of the absorbent base material include fine paper, medium-quality paper, high-quality paper, cotton, synthetic fiber fabric, silk, linen, woven fabric, non-woven fabric, leather and the like.

Examples of the base material on which surface coating is performed include coated paper, art paper, cast paper, lightweight coated paper, fine coated paper and the like.

[Primer Layer]

The printed matter may include a primer layer. The primer layer is formed on the surface of the base material (recording medium) and has the function of enhancing adhesion to the coloring layer and the brilliant layer.

A primer agent which can form the primer layer may be the active energy ray-curable ink composition, may be a solvent-based ink composition containing a solvent or may be a water-based ink composition containing water. The primer agent may be, for example, an ink composition which forms the coloring layer which will be described later, which has a resin component and a polymerizable compound as main components and in which a colorant is omitted or reduced and thus an adjustment is made such that a color is not visually recognized. The primer agent which has the same composition as the coloring layer is used, and thus it is possible to enhance adhesion to the coloring layer. The primer agent may be, for example, a conventionally known primer agent.

A method for applying the primer agent to the surface of the base material (recording medium) is not limited, and examples thereof include spray application, application using towel, sponge, non-woven fabric, tissue and the like, a dispenser, brush application, gravure printing, flexo-printing, silk screen printing, inkjet, heat transfer method and the like.

[Coloring Layer]

The printed matter may include the coloring layer. The coloring layer is a layer which contains a colorant (dye/pigment) used in a normal ink composition different from the brilliant pigment, and is a layer which is formed of the ink composition applied to the surface of the base material or the surface of a layer (such as the primer layer, a coating layer or the layer of a receptive solution) formed on the surface of the base material. The ink composition which forms the coloring layer may be the active energy ray-curable ink composition, may be a solvent-based non-aqueous ink composition containing a colorant and a solvent or may be an aqueous ink composition containing a colorant and water. A plurality of ink compositions (for example, a plurality of layers including a yellow ink, a magenta ink, a cyan ink and a black ink) may be provided. Since the brilliant layer formed of the ink composition according to the embodiment described above can suppress the degradation of the components, an image formed of the ink compositions as described above is provided, and thus an extremely well-designed printed matter which accentuates the image is provided.

The coloring layer may contain a resin. When the coloring layer contains a resin, the resin may be the resin of an ink layer which is the binder resin or a high polymer dispersant included in the ink composition without being processed or may be a cured product formed by discharging the polymerizable compound included in the ink composition to the surface of the base material (recording medium) and thereafter applying the active energy rays to polymerize the polymerizable compound.

A method for applying the ink composition to form the coloring layer is not particularly limited. Examples thereof include a spray method, a coater method, an inkjet method, a gravure method, a flexographic method and the like. Among them, the ink composition is preferably discharged (applied) by the inkjet method. By the inkjet method, it is easy to discharge (apply) the ink composition to any part of the base material or to discharge (apply) the ink composition to the entire base material.

The colorant of the ink composition which forms the coloring layer is not particularly limited, and the colorant may be dye-based or pigment-based. A pigment-based ink composition which has satisfactory resistances such as water resistance and light resistance to the coloring layer is preferably used. A pigment which can be used in the ink composition forming the coloring layer is not particularly limited. Examples thereof include an organic pigment, an inorganic pigment and the like used in a conventional ink composition. Only one type of these may be used or two types or more thereof may be combined to be used. Specific examples of the organic pigment include an insoluble azo pigment, a soluble azo pigment, a derivative from a dye, a phthalocyanine organic pigment, a quinacridone organic pigment, a perylene organic pigment, a dioxazine organic pigment, a nickel azo pigment, an isoindolinone organic pigment, a pyranthrone organic pigment, a thioindigo organic pigment, a condensed azo organic pigment, a benzimidazolone organic pigment, a quinophthalone organic pigment, an isoindoline organic pigment, a quinacridone solid solution pigment, an organic solid solution pigment such as a perylene solid solution pigment and the like, specific examples of the inorganic pigment include titanium oxide, zinc oxide and the like and specific examples of the other pigment include carbon black and the like. As the pigment which can be used in the ink composition, a plurality of organic pigments and inorganic pigments may be used together or a pigment dispersant member dispersed in a water-soluble solvent with a pigment dispersant and a self-dispersing pigment may be used together.

[Brilliant Layer]

The brilliant layer is a layer which is formed of the ink composition containing the brilliant pigment. Specifically, the brilliant layer is a layer which contains a brilliant pigment and is formed by using the inkjet method to discharge the active energy ray-curable ink composition containing the polymerizable compound, the brilliant pigment and the polymerization initiator to the surface of the adherend and applying the active energy rays or a layer which contains a brilliant pigment and is formed by using the inkjet method to discharge the non-aqueous ink composition containing the organic solvent and the brilliant pigment to the surface of the adherend and causing the organic solvent to volatilize.

The brilliant layer containing the brilliant pigment is provided, and thus it is possible to provide a metallic gloss to the adherend.

When the non-aqueous ink composition containing the organic solvent is used as the ink composition, the brilliant layer preferably contains 99.5% or less by mass of the brilliant pigment in the total amount of the brilliant layer, and more preferably contains 99.0% or less by mass. The brilliant layer preferably contains 45.0% or more by mass of the brilliant pigment in the total amount of the brilliant layer, more preferably contains 50.0% or more by mass and preferably contains 55.0% or more by mass.

When the active energy ray-curable ink composition is used as the ink composition, the brilliant layer preferably contains 5.0% or less by mass of the brilliant pigment in the total amount of the brilliant layer, more preferably contains 4.5% or less by mass and preferably contains 4.0% or less by mass. The brilliant layer preferably contains 0.3% or more by mass of the brilliant pigment in the total amount of the brilliant layer, more preferably contains 0.5% or more by mass and preferably contains 1.0% or more by mass.

[Overcoat Layer]

The printed matter may include an overcoat layer. The overcoat layer is formed on the uppermost surface of the printed matter (for example, the surface of the brilliant layer or the coloring layer), and has the function of enhancing the durability of the printed matter.

An overcoat agent which can form the overcoat layer may be the active energy ray-curable ink composition, may be the solvent-based ink composition containing a solvent or may be the water-based ink composition containing water. The overcoat agent may be, for example, the ink composition which forms the coloring layer described above, which has a resin component and a polymerizable compound as main components and in which a colorant is omitted or reduced and thus an adjustment is made such that a color is not visually recognized. The overcoat agent which has the same composition as the coloring layer is used, and thus it is possible to enhance adhesion to the coloring layer. The overcoat agent may be, for example, a conventionally known overcoat agent.

A method for applying the overcoat agent to the surface of the brilliant layer or the brilliant layer is not limited, and examples thereof include spray application, application using towel, sponge, non-woven fabric, tissue and the like, a dispenser, brush application, gravure printing, flexo-printing, silk screen printing, inkjet, heat transfer method and the like.

<4. Recording Method>

A recording method for using the ink composition according to the embodiment described above to perform recording on the surface of the base material (recording medium) is a recording method for discharging the ink composition by the inkjet method. The ink composition is discharged by the inkjet method, and this allows printed matters in small lots to be manufactured.

The inkjet recording device can be applied to any one of the inkjet recording devices of a piezo system, a thermal system, an electrostatic system and the like. The inkjet recording device described above may or may not have an ink circulation mechanism.

When the ink composition is the active energy ray-curable ink composition, the active energy rays are applied to the ink composition discharged by the inkjet method. Examples of the active energy rays include active energy rays of electromagnetic waves such as far ultraviolet rays, ultraviolet rays, near ultraviolet rays, visible rays, infrared rays, X-rays and γ rays or electron rays, proton rays and neutron rays. A light source for applying the active energy rays is not particularly limited, and examples thereof include a high pressure mercury lamp, a metal halide lamp, a low pressure mercury lamp, an ultra-high pressure mercury lamp, an ultraviolet laser, sunlight, an LED lamp and the like. In terms of energy savings and a high degree of flexibility in the design facilities of a printing device, the LED lamp is more preferably used as the light source.

When the ink composition is the non-aqueous ink composition, a drying mechanism may be included in the inkjet recording device in order to dry the non-aqueous ink composition discharged by the inkjet method.

<5. Method for Manufacturing Printed Matter>

The recording method for discharging the ink composition according to the embodiment described above to the surface of the base material can also be defined as a method for manufacturing the printed matter.

<6. Method for Inspecting Ink Composition>

As a method for inspecting the ink composition to be discharged by the inkjet method and containing the brilliant pigment, an inspection method using the amount of hydrogen generated from the ink composition as an indicator is mentioned.

Specifically, in the inspection method described above, the amount of hydrogen generated from the ink composition is measured under the environment of normal pressure at room temperature. The ink composition 100 of which generates hydrogen of 1 ml or less as measured under the environment of normal pressure at room temperature is rate good.

The ink composition containing the brilliant pigment which is rated good is the ink composition which can suppress the degradation of the components and has high storage stability.

EXAMPLES

Although the present invention will be described in further detail below using Examples, the present invention is not limited to the description at all.

1. Production of Brilliant Pigment (1) Brilliant Pigment S1

On a PET film having a film thickness of 100 μm, a resin layer coating liquid formed of 3.0% by mass of cellulose acetate butyrate (butylation rate of 35 to 39%, made by Kanto Chemical Co. Inc.) and 97% by mass of isopropanol was uniformly applied by a bar coat method, and was dried at 60° C. for 10 minutes, with the result that a resin layer thin film was formed on the PET film. Then, a vacuum deposition device (VE-1010 type vacuum deposition device made by Vacuum Device Company) was used to form a metal-containing thin film (aluminum) having an average film thickness of 20 nm on the resin layer.

Then, in diethylene glycol diethyl ether, a VS-150 ultrasonic dispersion machine (made by AS ONE CORPORATION) was used to simultaneously perform separation/miniaturization/dispersion treatment on the multilayer formed by the method described above for a cumulative ultrasonic dispersion treatment time of 12 hours, with the result that a brilliant pigment dispersion liquid was obtained.

On the metallic pigment dispersion liquid obtained, filtration treatment was performed with a SUS mesh filter having an opening of 5 μm, and thus coarse particles were removed. Then, the filtrate was placed in a round bottom flask, and diethylene glycol diethyl ether was distilled off using a rotary evaporator. In this way, the brilliant pigment dispersion liquid was concentrated, thereafter the concentration of the brilliant pigment dispersion liquid was adjusted and thus a brilliant pigment dispersion liquid S1 containing a brilliant pigment S1 was prepared. In the brilliant pigment S1, the volume-based 50% cumulative particle size (D50) was 1.1 μm, the volume-based 90% cumulative particle size (D90) was 1.9 μm and the thickness was 20 nm.

(2) Brilliant Pigment S2

The brilliant pigment dispersion liquid was manufactured in the same manner as described above, a solution obtained by dissolving 5 g of aromatic phosphate ester (CR-741 made by DAIHACHI CHEMICAL INDUSTRY CO., LTD.) in 100 g of acetone was added to 200 g of the brilliant pigment dispersion liquid and was stirred for one hour, thereafter the centrifugation and the washing operation described above were performed, acetone was replaced with diethylene glycol diethyl ether and thus a brilliant pigment dispersion liquid S2 subjected to surface protection treatment and containing a brilliant pigment S2 was prepared. In the brilliant pigment S2, the volume-based 50% cumulative particle size (D50) was 1.2 μm, the volume-based 90% cumulative particle size (D90) was 2.0 μm and the thickness was 25 nm.

(3) Brilliant Pigment S3

In the manufacturing of the brilliant pigment S2 described above, aromatic phosphate ester was replaced with 1 g of stearyl stearate, the same operation was performed and thus a brilliant pigment dispersion liquid S3 subjected to surface protection treatment and containing a brilliant pigment S3 was prepared. In the brilliant pigment S3, the volume-based 50% cumulative particle size (D50) was 1.2 μm, the volume-based 90% cumulative particle size (D90) was 2.0 μm and the thickness was 20 nm.

(4) Brilliant Pigment S4

In the manufacturing of the brilliant pigment S1 described above, the vacuum deposition device (VE-1010 type vacuum deposition device made by Vacuum Device Company) was used to form a metal-containing thin film (aluminum) having an average film thickness of 20 nm on the resin layer, with the result that a brilliant pigment dispersion liquid S4 containing indium as a brilliant pigment S4 was prepared. In the brilliant pigment S4, the volume-based 50% cumulative particle size (D50) was 0.3 µm, the volume-based 90% cumulative particle size (D90) was 0.9 µm and the thickness was 10 nm.

(5) Brilliant Pigment S5

In the manufacturing of the brilliant pigment S1 described above, the miniaturization treatment and the opening of the mesh filter were changed, and thus a brilliant pigment dispersion liquid S5 containing a brilliant pigment S5 was prepared. In the brilliant pigment S5, the volume-based 50% cumulative particle size (D50) was 0.5 µm, the volume-based 90% cumulative particle size (D90) was 0.9 µm and the thickness was 10 nm.

(6) Brilliant Pigment S6

In the manufacturing of the brilliant pigment S2 described above, aromatic phosphate ester was replaced with water-soluble triethyl phosphate (made by DAIHACHI CHEMICAL INDUSTRY CO., LTD.), the same operation was performed and thus a brilliant pigment dispersion liquid S6 subjected to surface protection treatment using a water-soluble compound and containing a brilliant pigment S6 was prepared. In the brilliant pigment S6, the volume-based 50% cumulative particle size (D50) was 1.1 µm, the volume-based 90% cumulative particle size (D90) was 1.9 µm and the thickness was 20 nm.

(7) Brilliant Pigment S7

As in the brilliant pigment S6 described above, triethyl phosphate was replaced with water-soluble $C_{12}H_{25}(O)P(OH)(OCH_2CH_3)$, the operation was performed and thus a brilliant pigment dispersion liquid S7 subjected to surface protection treatment using a water-soluble compound and containing a brilliant pigment S7 was prepared. In the brilliant pigment S7, the volume-based 50% cumulative particle size (D50) was 0.8 µm, the volume-based 90% cumulative particle size (D90) was 2.3 µm and the thickness was 20 nm.

(8) Brilliant pigment S8 In the manufacturing of the brilliant pigment S7 described above, $C_{12}H_{25}(O)P(OH)(OCH_2CH_3)$ was replaced with water-soluble 2-(perfluorohexyl)ethylphosphonic acid, the same operation was performed and thus a brilliant pigment dispersion liquid S8 subjected to surface protection treatment using a water-soluble compound and containing the brilliant pigment S6 was prepared. In the brilliant pigment S8, the volume-based 50% cumulative particle size (D50) was 0.8 µm, the volume-based 90% cumulative particle size (D90) was 2.3 µm and the thickness was 20 nm.

(9) Brilliant Pigment U1

On a PET film having a film thickness of 100 µm, a resin layer coating liquid formed of 3.0% by mass of cellulose acetate butyrate (butylation rate of 35 to 39%, made by Kanto Chemical Co. Inc.) and 97% by mass of isopropanol was uniformly applied by a bar coat method, and was dried at 60° C. for 10 minutes, with the result that a resin layer thin film was formed on the PET film. Then, a vacuum deposition device (VE-1010 type vacuum deposition device made by Vacuum Device Company) was used to form a metal-containing thin film (aluminum) having an average film thickness of 20 nm on the resin layer.

The multilayer obtained was immersed in isopropanol, and the "VS-150 ultrasonic dispersion machine" made by AS ONE CORPORATION was used to simultaneously perform separation/pulverization/fine dispersion treatment for 12 hours, with the result that a brilliant pigment dispersion liquid containing a brilliant pigment (metal-containing brilliant pigment formed of aluminum) was obtained.

A solution obtained by dissolving 5 g of polyester resin (Crylcoat 340, supplied by UCB, Belgium) having an acid number of 70 and 5 g of epoxy resin (Araldit GT6063ES, supplied by Vantico, Switzerland) having an epoxy equivalent weight of 750 in 100 g of acetone was added to 200 g of the brilliant pigment dispersion liquid obtained and was stirred for one hour, thereafter the centrifugation and the washing operation described above were performed, isopropanol and acetone were replaced with phenoxyethyl acrylate and thus a brilliant pigment dispersion liquid U1 subjected to surface protection treatment and containing 5% by mass of a brilliant pigment U1 was prepared. In the brilliant pigment U1, the volume-based 50% cumulative particle size (D50) was 2.3 µm, the volume-based 90% cumulative particle size (D90) was 3.0 µm and the thickness was 30 nm.

(10) Brilliant Pigment U2

In the manufacturing of the brilliant pigment S2 described above, diethylene glycol diethyl ether was replaced with phenoxyethyl acrylate, the same operation was performed and thus a brilliant pigment dispersion liquid U2 subjected to surface protection treatment using hydrophobic aromatic phosphate ester and containing a brilliant pigment U2 was prepared. In the brilliant pigment U2, the volume-based 50% cumulative particle size (D50) was 2.1 µm, the volume-based 90% cumulative particle size (D90) was 2.7 µm and the thickness was 25 nm.

(11) Brilliant Pigment U3

As in the manufacturing of the brilliant pigment S4 described above, a metal-containing thin film (indium) having an average film thickness of 20 nm was formed, diethylene glycol diethyl ether was replaced with phenoxyethyl acrylate, the same operation was performed and thus a brilliant pigment dispersion liquid U3 containing indium as a brilliant pigment U3 was prepared. In the brilliant pigment U3, the volume-based 50% cumulative particle size (D50) was 0.3 µm, the volume-based 90% cumulative particle size (D90) was 0.9 µm and the thickness was 10 nm.

(12) Brilliant Pigment U4

In the manufacturing of the brilliant pigment S6 described above, diethylene glycol diethyl ether was replaced with phenoxyethyl acrylate, the same operation was performed and thus a brilliant pigment dispersion liquid U4 subjected to surface protection treatment using a water-soluble compound and containing a brilliant pigment U4 was prepared. In the brilliant pigment U4, the volume-based 50% cumulative particle size (D50) was 2.0 µm, the volume-based 90% cumulative particle size (D90) was 2.5 µm and the thickness was 20 nm.

(13) Brilliant Pigment U5

On a PET film having a film thickness of 100 µm, a resin layer coating liquid formed of 3.0% by mass of cellulose acetate butyrate (butylation rate of 35 to 39%, made by Kanto Chemical Co. Inc.) and 97% by mass of isopropanol was uniformly applied by a bar coat method, and was dried at 60° C. for 10 minutes, with the result that a resin layer thin film was formed on the PET film. Then, a vacuum deposition device (VE-1010 type vacuum deposition device made by Vacuum Device Company) was used to form a metal-containing thin film (aluminum) having an average film thickness of 20 nm on the resin layer.

The multilayer obtained was immersed in diethylene glycol diethyl ether, and the "VS-150 ultrasonic dispersion machine" made by AS ONE CORPORATION was used to simultaneously perform separation/pulverization/fine dispersion treatment for 12 hours, with the result that a brilliant pigment dispersion liquid containing a brilliant pigment (metal-containing brilliant pigment formed of aluminum) was obtained. In the brilliant pigment U5, the volume-based 50% cumulative particle size (D50) was 2.0 µm, the volume-based 90% cumulative particle size (D90) was 2.5 µm and the thickness was 20 nm.

(14) Brilliant Pigment U6

In the manufacturing of the brilliant pigment S7 described above, diethylene glycol diethyl ether was replaced with phenoxyethyl acrylate, the same operation was performed and thus a brilliant pigment dispersion liquid U6 subjected to surface protection treatment using a water-soluble compound and containing a brilliant pigment U6 was prepared. In the brilliant pigment U6, the volume-based 50% cumulative particle size (D50) was 0.8 µm, the volume-based 90% cumulative particle size (D90) was 2.3 µm and the thickness was 25 nm.

(15) Brilliant Pigment U7

In the manufacturing of the brilliant pigment S8 described above, diethylene glycol diethyl ether was replaced with phenoxyethyl acrylate, the same operation was performed and thus a brilliant pigment dispersion liquid U7 subjected to surface protection treatment using a water-soluble compound and containing a brilliant pigment U7 was prepared. In the brilliant pigment U7, the volume-based 50% cumulative particle size (D50) was 0.8 µm, the volume-based 90% cumulative particle size (D90) was 1.8 µm and the thickness was 20 nm.

2. Manufacturing of Ink Compositions

The "brilliant pigment dispersion liquids" described above were used, and thus ink compositions in Experimental Examples were manufactured. Specifically, the brilliant pigment dispersion liquids described above, a polymerizable compound, a polymerization initiator, a polymerization inhibitor, various types of organic solvents, a resin and a surfactant were used to prepare the ink compositions in the Examples and the Comparative Examples so as to achieve ratios in the table below. The unit was % by mass.

TABLE 1

| | | | Example 1 | Example 2 | Example 3 | Example 4 | Example 5 | Example 6 |
|---|---|---|---|---|---|---|---|---|
| Ink composition | Glossy pigment | Glossy pigment S1 | 1.5 | | | | | 1.5 |
| | | Glossy pigment S2 | | 1.5 | | | 3 | |
| | | Glossy pigment S3 | | | 3 | | | |
| | | Glossy pigment S4 | | | | 3 | | |
| | | Glossy pigment S5 | | | | | | |
| | | Glossy pigment S6 | | | | | | |
| | | Glossy pigment S7 | | | | | | |
| | | Glossy pigment S8 | | | | | | |
| | Organic solvent | DEGDME | 69.7 | | | 10 | 46.2 | 59.7 |
| | | DEGMEE | | | 61 | 61 | 20 | |
| | | DEGDEE | | 77.7 | 20 | 20 | 30 | 8 |
| | | DEGBEAC | | | 5 | 5 | | |
| | | PG | | 8 | 10 | | | 10 |
| | | GBL | 20 | | | | | 20 |
| | | ECL | | 20.0 | | | | |
| | Resin | | 0.5 | 0.5 | 0.5 | 0.5 | 0.5 | 0.5 |
| | Surfactant | | 0.3 | 0.3 | 0.3 | 0.3 | 0.3 | 0.3 |
| | Total | | 100.0 | 108.0 | 100.0 | 100.0 | 100.0 | 100.0 |
| Evaluations | Amount of hydrogen generated(ml) | | 0.5 | 0.2 | 0.1 | 0.05 | 0.1 | 0.2 |
| | Amount of hydrogen generated when water was contained(ml) | | 3 | 1 | 1 | 0.1 | 2 | 3.5 |
| | Gloss | | A | A | A | A | A | A |
| | Printed matter storage stability | | A | B | A | A | A | B |
| | Ink storage stability | | A | A | A | A | A | B |

| | | | Comparative Example 1 | Comparative Example 2 | Comparative Example 3 | Comparative Example 4 | Comparative Example 5 |
|---|---|---|---|---|---|---|---|
| Ink composition | Glossy pigment | Glossy pigment S1 | | | | | |
| | | Glossy pigment S2 | | | | | |
| | | Glossy pigment S3 | | | | | |
| | | Glossy pigment S4 | | | | | |
| | | Glossy pigment S5 | 3 | 3 | | | |
| | | Glossy pigment S6 | | | 3 | | |
| | | Glossy pigment S7 | | | | 3 | |
| | | Glossy pigment S8 | | | | | 3 |
| | Organic solvent | DEGDME | 68.2 | | | 68.2 | |
| | | DEGMEE | | | 61 | | |
| | | DEGDEE | | 76.2 | 20 | | 76.2 |
| | | DEGBEAC | | 20 | 5 | | 20 |
| | | PG | 8 | | 10 | 8 | |
| | | GBL | | | | | |
| | | ECL | 20 | | | 20 | |
| | Resin | | 0.5 | 0.5 | 0.5 | 0.5 | 0.5 |
| | Surfactant | | 0.3 | 0.3 | 0.3 | 0.3 | 0.3 |
| | Total | | 100.0 | 100.0 | 100.0 | 100.0 | 100.0 |

TABLE 1-continued

| | | | | | | |
|---|---|---|---|---|---|---|
| Evaluations | Amount of hydrogen generated(ml) | 1.8 | 1.1 | 1.6 | 1.8 | 1.8 |
| | Amount of hydrogen generated when water was contained(ml) | 10 | 6 | 8 | 10 | 6 |
| | Gloss | A | A | B | A | A |
| | Printed matter storage stability | C | C | C | C | C |
| | Ink storage stability | B | B | C | C | B |

TABLE 2

| | | | Example 7 | Example 8 | Example 9 | Example 10 | Example 11 | Comparative Example 6 |
|---|---|---|---|---|---|---|---|---|
| Ink composition | Glossy pigment | Glossy pigment U1 | 3 | | | 2 | | |
| | | Glossy pigment U2 | | 3 | | | 3 | |
| | | Glossy pigment U3 | | | 5 | | | |
| | | Glossy pigment U4 | | | | | | 2 |
| | | Glossy pigment U5 | | | | | | |
| | | Glossy pigment U6 | | | | | | |
| | | Glossy pigment U7 | | | | | | |
| | Polymerizable compound | P H E A | 41.9 | | 54.9 | | 57.9 | 38.9 |
| | | 19N D A | 30 | | | 35 | 10 | |
| | | I B X A | 15 | 5 | | | 10 | |
| | | 16H D A | | 79.9 | 30 | 53.9 | | 30 |
| | | HEA | | | | | 5 | 20 |
| | Polymerization inhibitor | | 0.1 | 0.1 | 0.1 | 0.1 | 0.1 | 0.1 |
| | Photopolymerization initiator | Photopolymerization initiator 1 | 10 | 8 | 10 | 3 | 8 | 3 |
| | | Photopolymerization initiator 2 | | | | 3 | 3 | 3 |
| | | Photopolymerization initiator 3 | | 4 | | 3 | 3 | 3 |
| Evaluations | | Total | 100.0 | 100.0 | 100.0 | 100.0 | 100.0 | 100.0 |
| | | Amount of hydrogen generated(ml) | 0.05 | 0.1 | 0.05 | 0.05 | 0.1 | 1.2 |
| | | Amount of hydrogen generated when water was contained(ml) | 0.1 | 0.3 | 0.1 | 0.1 | 0.2 | 2.5 |
| | | Gloss | A | A | A | A | A | B |
| | | Printed matter storage stability | A | A | A | A | A | B |
| | | Ink storage stability 1 | A | A | A | A | A | B |
| | | Ink storage stability 2 | A | A | A | A | A | C |

| | | | Comparative Example 7 | Comparative Example 8 | Comparative Example 9 | Comparative Example 10 | Comparative Example 11 |
|---|---|---|---|---|---|---|---|
| Ink composition | Glossy pigment | Glossy pigment U1 | | | | | |
| | | Glossy pigment U2 | | | | | |
| | | Glossy pigment U3 | | | | | |
| | | Glossy pigment U4 | 5 | | | | |
| | | Glossy pigment U5 | | 5 | | | |
| | | Glossy pigment U6 | | | 2 | 3 | |
| | | Glossy pigment U7 | | | | | 5 |
| | Polymerizable compound | P H E A | 54.9 | 54.9 | | 41.9 | 54.9 |
| | | 19N D A | | | 35 | 30 | |
| | | I B X A | | | | 15 | |
| | | 16H D A | 30.0 | 30 | 53.9 | | 30 |
| | | HEA | | | | | |
| | Polymerization inhibitor | | 0.1 | 0.1 | 0.1 | 0.1 | 0.1 |
| | Photopolymerization initiator | Photopolymerization initiator 1 | 10 | 10 | 3 | 10 | 10 |
| | | Photopolymerization initiator 2 | | | 3 | | |
| | | Photopolymerization initiator 3 | | | 3 | | |

TABLE 2-continued

| | | | | | | |
|---|---|---|---|---|---|---|
| | Total | 100.0 | 100.0 | 100.0 | 100.0 | 100.0 |
| Evaluations | Amount of hydrogen generated(ml) | 1.1 | 1.4 | 1.5 | 1.5 | 1.2 |
| | Amount of hydrogen generated when water was contained(ml) | 1.2 | 1.5 | 1.8 | 2.3 | 1.5 |
| | Gloss | A | A | B | A | A |
| | Printed matter storage stability | B | B | B | B | B |
| | Ink storage stability 1 | B | B | B | B | B |
| | Ink storage stability 2 | C | 0 | C | C | C |

In Table 1, "DEGDME" indicates diethylene glycol dimethyl ether.

In Table 1, "DEGMEE" indicates diethylene glycol methyl ethyl ether.

In Table 1, "DEGDEE" indicates diethylene glycol diethyl ether.

In Table 1, "DEGBEAC" indicates diethylene glycol diethyl ether acetate.

In Table 1, "PG" indicates propylene glycol.

In Table 1, "GBL" indicates γ-butyrolactone.

In Table 1, "ECL" indicates ε-caprolactone.

In Table 1, "resin" indicates cellulose acetate butyrate resin (CAB made by Kanto Chemical Co. Inc.).

In Table 1, "surfactant" indicates silicone surfactant (KF-96-2cs made by Shin-Etsu Chemical Co., Ltd.).

In Table 2, "PHEA" indicates phenoxyethyl acrylate (kyoeisha Chemical Co., Ltd.).

In Table 2, "19NDA" indicates 1,9-nonanediol diacrylate (kyoeisha Chemical Co., Ltd.).

In Table 2, "IBXA" indicates isobornyl acrylate (kyoeisha Chemical Co., Ltd.).

In Table 2, "16HDA" indicates 1,6-hexanediol diacrylate (kyoeisha Chemical Co., Ltd.).

In Table 2, "HEA" indicates hydroxyethyl acrylate (OSAKA ORGANIC CHEMICAL INDUSTRY LTD.).

In Table 2, "polymerization inhibitor" indicates phenothiazine (ANTAGE TDP made by Kawaguchi Chemical Industry Co., LTD.).

In Table 2, "polymerization initiator 1" indicates 2,4,6-trimethylbenzoyl-diphenyl-phosphine oxide (IRGACURE TPO made by BASF SE).

In Table 2, "polymerization initiator 2" indicates 2-dimethylamino-2-(4-methylbenzyl)-1-(4-morpholin-4-yl-phenyl)-butan-1-one (Omnirad 379EG made by IGM Resins B.V.).

In Table 2, "polymerization initiator 3" indicates 2,4-diethylthioxanthone (Speedcure DETX made by Lambson Ltd.).

3. Evaluations (1) Measurement of Amount of Hydrogen Generated

The amount of hydrogen generated from each of the ink compositions in the Examples and the Comparative Examples was measured. Specifically, 25 g of each of the ink compositions in the Examples and the Comparative Examples and 200 ml of dried air were put into a sample bag for gas collection formed of an aluminum laminate five-layer structure material and were sealed, and were stored at 60° C. for 24 hours. Then, 20 ml of the gas was sampled from the sample bag with a gas extractor equipped with a hydrogen detection tube, and the amount of hydrogen generated from 100 g of the ink was measured from the display of the detection tube ("amount of hydrogen generated (ml)" written in the table).

(2) Measurement of Amount of Hydrogen Generated when Water was Contained

The amount of hydrogen generated from each of the ink compositions in the Examples and the Comparative Examples when water was contained was measured. Specifically, 25 g of each of the ink compositions in the Examples and the Comparative Examples, 10 g of water (deionized water) and 200 ml of dried air were put into the sample bag for gas collection formed of the aluminum laminate five-layer structure material and were sealed, and were stored at 60° C. for 24 hours. Then, 20 ml of the gas was sampled from the sample bag with the gas extractor equipped with the hydrogen detection tube, and the amount of hydrogen generated from 100 g of the ink composition was measured from the display of the detection tube ("amount of hydrogen generated when water was contained (ml)" written in the table).

(3) Glossiness Evaluation

Figure 1:
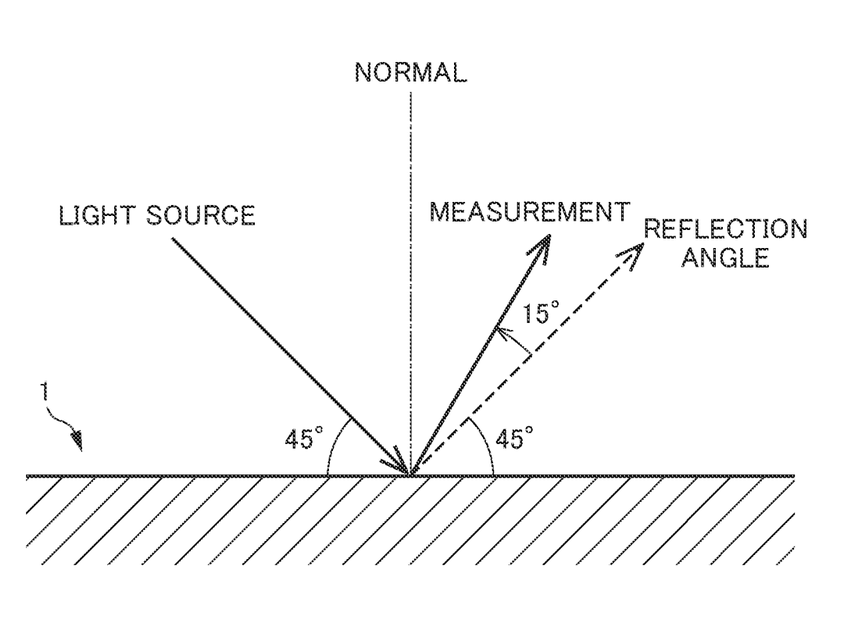
FIG. 1 is a schematic view showing the measurement angle of L* (lightness index) in a L*a*b* color system in the glossiness evaluation of Examples.

The glossiness of a printed matter obtained using each of the non-aqueous ink compositions in the Examples and the Comparative Examples was evaluated. Specifically, each of the non-aqueous ink compositions in the Examples and the Comparative Examples was discharged to the surface of a PET film (Cosmo Shine A4300 made by TOYOBO CO., LTD.) with an inkjet recording device "material printer DMP-2850" made by FUJIFILM Corporation, and when the ink composition was an active energy ray-curable ink composition, light was applied from an LED lamp of 385 nm to cure the ink composition whereas when the ink composition was a non-aqueous ink composition, a printed matter was heated to 60° C. and dried, and thus the printed matter was manufactured. For the printed matter obtained, using a multi-angle colorimeter CM-M6 manufactured by KONICA MINOLTA, INC., as shown in FIG. 1, incident light was applied to the brilliant layer at an incident angle of 45° from a printed surface, an angle obtained by changing a reflection angle for the incident angle by 15° toward the normal direction was assumed to be a measurement angle, an L* value in a L*a*b* color system was measured at the measurement angle and the glossiness thereof was evaluated according to the following evaluation criteria ("Glossiness" written in the table).

Evaluation Criteria

A: L* value was equal to or greater than 130

B: L* value was equal to or greater than 110 and less than 130

C: L* value was less than 110

A and B were within an actual usable range.

(4) Printed Matter Storage Stability Test

The printed matter storage stability of the printed matter obtained using each of the ink compositions in the Examples and the Comparative Examples was evaluated. Specifically, the printed matter obtained as described above was stored at a temperature of 60° C. and a humidity of 95% for 500 hours, the brilliant after the storage was measured by the same method as described above and a difference in the L* value was determined ("printed matter storage stability" written in the table).

Evaluation Criteria
A: difference in L* value was less than 10
B: difference in L* value was equal to or greater than 10 and less than 20
C: difference in L* value was equal to or greater than 20
A and B were within an actual usable range.

(5) Ink Storage Stability Test 1

The storage stability of each of the ink compositions (active energy ray-curable ink compositions) in the Examples and the Comparative Examples was evaluated. Specifically, each of the ink compositions in the Examples and the Comparative Examples was left to stand at 40° C. for two weeks, and then the viscosity of the ink composition after the test was measured. The viscosity was measured according to DIN EN ISO 12058-1 using a falling ball viscometer at 40° C. When the initial viscosity was assumed to be Va and the viscosity after the ink composition was left to stand for two weeks was assumed to be Vb, a viscosity change rate (Vb−Va)/Va×100 was determined ("ink storage stability 1" written in the table).

Evaluation Criteria
A: viscosity change rate was less than 5%
B: viscosity change rate was equal to or greater than 5% and less than 10%
C: viscosity change rate was equal to or greater than 10%
A and B were within an actual usable range.

(6) Ink Storage Stability Test 2

The storage stability of each of the ink compositions in the Examples and the Comparative Examples was evaluated. Specifically, each of the ink compositions in the Examples and the Comparative Examples was left to stand at 60° C. for two weeks, and then the viscosity of the ink composition after the test was measured. The viscosity was measured according to DIN EN ISO 12058-1 using the falling ball viscometer at 25° C. in Examples 1 to 6 and Comparative Examples 1 to 3 and at 40° C. in Examples 7 to 12 and Comparative Examples 4 to 6. When the initial viscosity was assumed to be Va and the viscosity after the ink composition was left to stand for two weeks was assumed to be Vb, the viscosity change rate (Vb−Va)/Va×100 was determined ("ink storage stability 2" written in the table).

Evaluation Criteria
A: viscosity change rate was less than 5%
B: viscosity change rate was equal to or greater than 5% and less than 10%
C: viscosity change rate was equal to or greater than 10%
A and B were within an actual usable range.

It has been found from the above table that in each of the ink compositions of the Examples in which the amount of hydrogen generated from 100 g of the ink composition was 1 ml or less, as measured under the environment of normal pressure at room temperature, the gloss of the printed matter was satisfactory and the storage stability was high.

On the other hand, in each of the ink compositions of the Comparative Examples in which the amount of hydrogen generated from 100 g of the ink composition was greater than 1 ml, the storage stability was degraded, and thus the effect of the present invention was not achieved.

In each of the ink compositions of the Comparative Examples which contained the brilliant pigment subjected to surface protection treatment using a water-soluble compound, the amount of hydrogen generated from 100 g of the ink composition was greater than 1 ml, and when the water-soluble compound was used as a protective layer for protecting the surface of the brilliant pigment, the oxidation of the brilliant pigment could not be suppressed, with the result that the generation of hydrogen was not effectively suppressed. Therefore, it is found that when a protective layer is formed (applied) on the surface of the brilliant pigment, the protective layer is formed of a hydrophobic compound, and thus it is possible to reduce the amount of hydrogen generated from 100 g of the ink composition.

As described above, by at least one configuration selected from the following: the configuration in which the type of brilliant pigment is selected; the configuration in which a protective layer for protecting the surface of the brilliant pigment is provided; and the configuration in which the protective layer is formed of a hydrophobic compound are adopted, it is possible to reduce the amount of hydrogen generated from the ink composition containing the brilliant pigment, a person skilled in the art who has consulted the present specification can clearly understand a technical method for setting the amount of hydrogen generated from 100 g of the ink composition to 1 ml or less and can perform a normal experiment to prepare the ink composition in which the amount of hydrogen generated is 1 ml or less. If the amount of hydrogen generated is adjusted to 1 ml or less, it is possible to provide the brilliant ink composition in which the storage stability of the ink is satisfactory and the storage stability of the printed matter is satisfactory.

EXPLANATION OF REFERENCE NUMERALS 1 printed matter

The invention claimed is:

1. An ink composition to be discharged by an inkjet method, the ink composition comprising:
a brilliant pigment,
a surface of the brilliant pigment coated with a layer formed of resin or hydrophobic compound, and
an amount of hydrogen generated from 100 g of the ink composition being 1 ml or less as measured under the environment of normal pressure at room temperature,
wherein the amount of hydrogen is measured by placing 25g of the ink composition and 200 ml of dry air in a sample bag, sealing the bag, storing it at 60° C. for 24 hours, and then collecting 20 ml of gas from the sample bag for hydrogen measurement, and
wherein a cumulative particle size D50 of the brilliant pigment is 1.1 μm or more and 3.0 μm or less.

2. The ink composition according to claim 1, wherein the ink composition is an active energy ray-curable ink composition.

3. The ink composition according to claim 2, wherein the brilliant pigment is a metal-containing brilliant pigment.

4. The ink composition according to claim 3, wherein the metal-containing brilliant pigment comprises aluminum and/or indium.

5. The ink composition according to claim 1, wherein the ink composition is a non-aqueous ink composition containing an organic solvent.

6. The ink composition according to claim 5, wherein the brilliant pigment is a metal-containing brilliant pigment.

7. The ink composition according to claim 6, wherein the metal-containing brilliant pigment comprises aluminum and/or indium.

8. The ink composition according to claim 1, wherein the brilliant pigment is a metal-containing brilliant pigment.

9. The ink composition according to claim 8, wherein the metal-containing brilliant pigment comprises aluminum and/or indium.

10. A recording method comprising: discharging an ink composition by an inkjet method,
- the ink composition comprising a metal-containing brilliant pigment,
- a surface of the brilliant pigment coated with a layer formed of resin or hydrophobic compound,
- an amount of hydrogen generated from 100 g of the ink composition being 1 ml or less as measured under the environment of normal pressure at room temperature,
- wherein the amount of hydrogen is measured by placing 25g of the ink composition and 200 ml of dry air in a sample bag, sealing the bag, storing it at 60° C. for 24 hours, and then collecting 20 ml of gas from the sample bag for hydrogen measurement, and
- wherein a cumulative particle size D50 of the brilliant pigment is 1.1 µm or more and 3.0 µm or less.

11. A method for manufacturing a printed matter, the method comprising discharging an ink composition by an inkjet method,
- the ink composition containing a brilliant pigment,
- a surface of the brilliant pigment coated with a layer formed of resin or hydrophobic compound,
- an amount of hydrogen generated from 100 g of the ink composition being 1 ml or less as measured under the environment of normal pressure at room temperature,
- wherein the amount of hydrogen is measured by placing 25g of the ink composition and 200 ml of dry air in a sample bag, sealing the bag, storing it at 60° C. for 24 hours, and then collecting 20 ml of gas from the sample bag for hydrogen measurement, and
- wherein a cumulative particle size D50 of the brilliant pigment is 1.1 µm or more and 3.0 µm or less.

12. The method for manufacturing a printed matter according to claim 11,
- the method further comprising rating the ink composition as good when an amount of hydrogen generated per 100g of the ink composition is 1 ml or less as measured under the environment of normal pressure at room temperature.

* * * * *